US012539630B2

(12) United States Patent
Ren et al.

(10) Patent No.: US 12,539,630 B2
(45) Date of Patent: Feb. 3, 2026

(54) ELECTRIC SHAVER, HANDHELD HOUSEHOLD ELECTRICAL APPLIANCE, ELECTRIC SHAVER SYSTEM, AND CONTROL METHOD

(71) Applicant: SHANGHAI FLYCO ELECTRICAL APPLIANCE CO., LTD., Shanghai (CN)

(72) Inventors: Xiaodong Ren, Shanghai (CN); Haihu Huang, Shanghai (CN); Gaiteng Li, Shanghai (CN)

(73) Assignee: SHANGHAI FLYCO ELECTRICAL APPLIANCE CO., LTD., Shanghai (CN)

( * ) Notice: Subject to any disclaimer, the term of this patent is extended or adjusted under 35 U.S.C. 154(b) by 693 days.

(21) Appl. No.: 17/754,210

(22) PCT Filed: Sep. 23, 2020

(86) PCT No.: PCT/CN2020/117107
§ 371 (c)(1),
(2) Date: Mar. 26, 2022

(87) PCT Pub. No.: WO2021/057787
PCT Pub. Date: Apr. 1, 2021

(65) Prior Publication Data

US 2022/0324125 A1 Oct. 13, 2022

(30) Foreign Application Priority Data

Sep. 27, 2019 (CN) ........................ 201910929923.8
Jul. 22, 2020 (CN) ........................ 202010712582.1
Sep. 2, 2020 (CN) ........................ 202010913552.7

(51) Int. Cl.
*B26B 19/38* (2006.01)
*B26B 19/14* (2006.01)

(52) U.S. Cl.
CPC ............ *B26B 19/388* (2013.01); *B26B 19/14* (2013.01)

(58) Field of Classification Search
CPC .............. H03K 17/9645; H03K 17/965; B26B 19/388; B26B 19/3873; B26B 19/14–148; B26B 19/3886
See application file for complete search history.

(56) References Cited

U.S. PATENT DOCUMENTS 4,380,121 A * 4/1983 Naimer .............. H03K 17/9645 30/42
4,531,287 A * 7/1985 Shibata .................. B26B 19/28 200/600

(Continued)

FOREIGN PATENT DOCUMENTS

CN 1750912 A 3/2006
CN 101318334 A 12/2008

(Continued)

OTHER PUBLICATIONS

CN110802641 English Translation; Qiu, Yun-feng; Feb. 18, 2020; B26B19/38.*

(Continued)

*Primary Examiner* — Laura M Lee
(74) *Attorney, Agent, or Firm* — Wolter Van Dyke Davis, PLLC; Eugene J. Molinelli; Michael W. Taylor

(57) ABSTRACT

An electric shaver, including a machine body and a cutting head that are connected to one another; the machine body includes an outer casing, a control chip and a driving component which are provided within the outer casing, and a handle sensing element which is provided on the outer casing; the cutting head includes a head portion sensing element; the control chip is simultaneously connected to the driving component, handle sensing element and head portion sensing element; and the driving component is also (Continued)

connected to the cutting head. The electric shaver will automatically start up when both the handle sensing element and the head portion sensing element sense the proximity of a human body (skin). Provided also are a corresponding handheld household electrical appliance, an electric shaver system, and a control method.

12 Claims, 15 Drawing Sheets

(56) References Cited

U.S. PATENT DOCUMENTS

| | | | | | |
|---|---|---|---|---|---|
| 5,111,580 | A * | 5/1992 | Bosscha | B26B 19/388 30/41.7 |
| 6,354,005 | B1 * | 3/2002 | Bosch | B26B 19/14 30/43.6 |
| 6,836,966 | B2 * | 1/2005 | Patrick | B26B 21/48 30/140 |
| 6,951,229 | B2 * | 10/2005 | Garrison | B67D 7/44 141/206 |
| 8,479,624 | B2 * | 7/2013 | Flyash | B26B 21/48 83/13 |
| 10,114,354 | B2 * | 10/2018 | Simeth | A61C 17/221 |
| 10,736,396 | B2 * | 8/2020 | Kindermann | B26B 19/388 |
| 2004/0098862 | A1 | 5/2004 | Orloff | |
| 2006/0037197 | A1 | 2/2006 | Hawes et al. | |
| 2006/0070242 | A1 * | 4/2006 | Szczepanowski | B26B 21/48 30/140 |
| 2008/0271319 | A1 | 11/2008 | Saker et al. | |

FOREIGN PATENT DOCUMENTS

| | | | | | |
|---|---|---|---|---|---|
| CN | 101610879 | A | | 12/2009 | |
| CN | 202794927 | U | * | 3/2013 | B26B 19/042 |
| CN | 104760064 | A | | 7/2015 | |
| CN | 208575902 | U | | 3/2019 | |
| CN | 208946223 | U | * | 6/2019 | B26B 19/38 |
| CN | 110480690 | A | | 11/2019 | |
| CN | 210879769 | U | | 6/2020 | |
| CN | 111730645 | A | * | 10/2020 | B26B 19/143 |
| DE | 3021966 | A1 | * | 6/1980 | B26B 19/3886 |
| EP | 0127237 | A1 | | 12/1984 | |
| EP | 0432849 | A1 | | 6/1991 | |
| JP | 59-184778 | U | | 12/1984 | |
| JP | 63-028968 | A | | 2/1988 | |
| JP | 64-025891 | A | | 1/1989 | |
| JP | 2002-311114 | A | | 10/2002 | |
| JP | 2002-533187 | A | | 10/2002 | |
| JP | 2005-536287 | A | | 12/2005 | |
| JP | 2006-520212 | A | | 9/2006 | |

OTHER PUBLICATIONS

CN202794927 English Translation; Hu, Xia-min; Mar. 13, 2013; B26B19/38.*

CN208946223 English Translation; Zhou, E-lin; Jun. 7, 2019; B26B19/38.*

International Search Report and Written Opinion (with English translation) for International Patent Application No. PCT/CN2020/117107 dated Dec. 28, 2020, pp. 1-14.

Decision to grant a European patent received for European Application No. 20869515.5, mailed on Jan. 7, 2025, 3 pages.

Intention to grant received for European Application No. 20869515.5, mailed on Sep. 16, 2024, 6 pages.

International Preliminary Report on Patentability received for PCT Patent Application No. PCT/CN20/117107, mailed on Apr. 7, 2022, 12 pages (6 pages of English Translation and 6 pages of Original Document).

Office Action received for European Application No. 20869515.5, mailed on Feb. 27, 2024, 5 pages.

Office Action received for European Application No. 20869515.5, mailed on Jul. 19, 2023, 6 pages.

Office Action received for Japanese Application No. 2022-519560, mailed on May 9, 2023, 4 pages (2 pages of original office action and 2 pages of English Translation).

Supplementary European Search Report and Search Opinion received for EP Application No. 20869515.5, mailed on Jul. 7, 2023, 4 pages.

* cited by examiner

ELECTRIC SHAVER, HANDHELD HOUSEHOLD ELECTRICAL APPLIANCE, ELECTRIC SHAVER SYSTEM, AND CONTROL METHOD

CROSS-REFERENCE TO RELATED APPLICATION

The present disclosure claims priority of Chinese patent application with the filing number 2019109299238 filed on Sep. 27, 2019 with the Chinese Patent Office, and entitled "Electric Shaver and Electric Shaver System";

priority of Chinese patent application with the filing number 2020107125821 filed on Jul. 22, 2020 with the Chinese Patent Office, and entitled "Electric Shaver"; and priority of Chinese patent application with the filing number 2020109135527 filed on Sep. 2, 2020 with the Chinese Patent Office, and entitled "Handheld Household Electrical Appliance", the contents of which are incorporated herein by reference in entirety.

TECHNICAL FIELD

The present disclosure relates to the technical field of personal care electrical appliance, in particular to an electric shaver, a handheld household electrical appliance, an electric shaver system and a control method.

BACKGROUND ART

Shaver includes beard clipper, hair clipper and the like, which is a type of cutter for people to shave beard, hair and the like. Electric shaver has been recognized, popularized and widely used by market consumers, and electric beard clipper/hair clipper and the like have entered thousands of households. With the improvement of consumers' quality of life, consumers also have new personalized and differentiated acceptance and requirements for the electric shaver products used.

The inventor found in the research that the traditional electric shaver has at least the following shortcomings, wherein the switches of the traditional electric shaver are light-touch key switch and mechanical push switch, and the two types of electric shavers both require the user to press the switch separately to be started, so they are inconvenient to use and cannot meet the increasing usage requirement of users.

SUMMARY

The present disclosure provides an electric shaver, a handheld household electrical appliance, an electric shaver system and a control method, which can be convenient for user to use and improve the experience feeling of user.

The embodiments of the present disclosure can be implemented as follows.

The embodiment of the present disclosure provides an electric shaver, which comprises a machine body and a cutter head that are connected to each other, wherein the machine body comprises a housing, a control chip and a driving component which are provided within the housing, and a handle induction element which is provided on the housing, and the cutter head comprises a head portion induction element, wherein the control chip is respectively connected to the driving component, the handle induction element and the head portion induction element, and the driving component is further connected to the cutter head; and the handle induction element is configured to generate a first induction signal when sensing the proximity of the skin, and send the first induction signal to the control chip; the head portion induction element is configured to generate a second induction signal when sensing the proximity of the skin, and send the second induction signal to the control chip; and the control chip is configured to send a driving control signal to the driving component when receiving the first induction signal and the second induction signal, so that the driving component drives the cutter head to work.

Optionally, the handle induction element comprises a first induction coil provided on the inner wall of the housing; and the cutter head comprises a cutter net cover, and the head portion induction element comprises the cutter net cover and/or a second induction coil provided around the cutter net cover.

Optionally, the driving component comprises a motor control switch and a motor connected to each other, and the motor control switch is connected to the control chip, and the motor is connected to the cutter head, and the motor is configured to drive the cutter head to work.

Optionally, a charging interface is further provided on the housing, and a power conversion module, a charging switch and an electric energy storage module are further provided within the housing, wherein the power conversion module, the charging switch and the electric energy storage module are all connected to the control chip; and the power conversion module is connected to the charging interface and the charging switch at the same time, both the power conversion module and the charging switch are connected to the electric energy storage module.

The embodiment of the present disclosure further provides an electric shaver, wherein the electric shaver comprises a machine body and a cutter head that are connected to each other; the machine body comprises a housing, a control chip and a driving component, wherein the control chip and the driving component are provided within the housing, a head portion induction element is provided on the cutter head; the cutter head is in transmission connection with the driving component, and both the head portion induction element and the driving component are connected to the control chip; and the control chip is configured to control the driving component to be started when receiving a signal from the head portion induction element;

the cutter head may be closed or opened relative to the machine body, and when the cutter head is closed relative to the machine body, the driving component is in transmission connection with the cutter head, when the cutter head is opened relative to the machine body, the driving component is separated from the cutter head; and the electric shaver further comprises a guide assembly, the guide assembly is connected to the control chip; when the cutter head is closed relative to the machine body, the guide assembly is communicated to the head portion induction element, so that the control chip is communicated to the head portion induction element; and when the cutter head is opened relative to the machine body, the guide assembly is disconnected from the head portion induction element, so that the control chip is disconnected from the head portion induction element.

Optionally, the cutter head further comprises a cutter net cover and an inner blade provided inside the cutter net cover; and the head portion induction element comprises the cutter net cover, and the control chip may be communicated to the cutter net cover, so as to be configured to control the driving component to be started, so as to drive the inner blade to work, or control the driving component to be turned off to make the inner blade stop working when detecting that the electrical signal carried by the cutter net cover changes.

Optionally, the driving component comprises a motor and a transmission shaft assembly being in transmission connection with the motor; the motor is provided in the inner cavity of the housing and connected to the control chip; a drive connection hole communicating with the inner cavity of the housing is provided on an end surface of one end of the housing; the transmission shaft assembly is provided on the end surface, and the transmission shaft assembly passes through the drive connection hole to be in transmission connection with the motor; and when the cutter head is closed relative to the machine body, the transmission shaft assembly is in transmission connection with the cutter head, and when the cutter head is opened relative to the machine body, the transmission shaft assembly is separated from the cutter head;

the guide assembly is connected to the control chip and the transmission shaft assembly at the same time; when the transmission shaft assembly is in transmission connection with the cutter head, the control chip is communicated to the head portion induction element through the guide assembly, the transmission shaft assembly and the cutter head sequentially; and when the transmission shaft assembly is separated from the cutter head, the transmission shaft assembly is disconnected from the cutter head, so that the control chip is disconnected from the head portion induction element.

Optionally, the guide assembly comprises a first conductive sheet and a first conductive wire, wherein the first conductive sheet is connected to the transmission shaft assembly, and two ends of the first conductive wire are respectively connected to the control chip and the first conductive sheet.

Optionally, the first conductive wire is a shielded wire.

Optionally, the guide assembly comprises a conduction connection assembly and a conduction control assembly, wherein the conduction connection assembly is provided inside the housing and connected to the control chip; and the conduction control assembly is provided on the machine body, and when the cutter head is closed relative to the machine body, the conduction control assembly is communicated to the head portion induction element and the conduction connection assembly at the same time, so that the control chip is communicated to the head portion induction element through the conduction connection assembly and the conduction control assembly sequentially, when the cutter head is opened relative to the machine body, the conduction control assembly is disconnected from the head portion induction element, so that the control chip is disconnected from the head portion induction element.

Optionally, the conduction connection assembly comprises a second conductive sheet and a second conductive wire, the second conductive sheet is connected to one end of the conduction control assembly away from the cutter head, and the second conductive wire is connected to the control chip and the second conductive sheet at the same time.

Optionally, the second conductive wire is a shielded wire.

Optionally, a control connection hole communicating with the inner cavity of the housing is provided on the housing; the conduction control assembly comprises a connecting member and a control member, the connecting member passes through the control connection hole; the first end of the connecting member is located in the housing and configured to be communicated to the conduction connection assembly; the second end of the connecting member is located outside the housing and configured to be communicated to the head portion induction element; and the control member is provided on the connecting member; when the cutter head is closed relative to the machine body, the second end is communicated to the head portion induction element, and the first end is communicated to the conduction connection assembly, so that the control chip is communicated to the head portion induction element; when the cutter head is opened relative to the machine body, the second end is disconnected from the head portion induction element, and the control member makes the first end disconnected from the conduction connection assembly, so that the control chip is disconnected from the connecting member and the head portion induction element at the same time.

Optionally, the connecting member comprises a connecting component and a blocking component, the connecting component passes through the control connection hole, and one end of the connecting component is located in the housing, the other end of the connecting component is located outside the housing, the blocking component is connected to one end of the connecting component located inside the housing; and the blocking component is configured to abut against the housing to prevent the connecting member from disengaging from the housing.

Optionally, the control member comprises an elastic component, the elastic component is connected to the connecting member, and the elastic component is configured to make the connecting member have a tendency of moving away from the conduction connection assembly; when the cutter head is closed relative to the machine body, the connecting member compresses the elastic component, and the first end of the connecting member is communicated to the conduction connection assembly, so that the control chip is communicated to the head portion induction element through the conduction connection assembly and the connecting member sequentially; and when the cutter head is opened relative to the machine body, the connecting member is away from the conduction connection assembly under the action of the elastic force of the elastic component, so that the connecting member is disconnected from the conduction connection assembly, and the control chip is disconnected from the cutter head.

Optionally, the guide assembly further comprises a cutter net contacting elastic piece, and the cutter net contacting elastic piece is provided on the cutter head, and connected to the head portion induction element, when the cutter head is closed relative to the machine body, the conduction control assembly is communicated to the head portion induction element through the cutter net contacting elastic piece.

Optionally, the electric shaver further comprises a cutter head support movably connected to the machine body, a plurality of the cutter heads are provided, a plurality of the cutter heads are all provided on the cutter head support, and the cutter net contacting elastic piece comprises a first elastic piece part connected to the head portion induction element and a second elastic piece part configured to be communicated to the conduction control assembly, the first elastic piece part and the second elastic piece part are connected to each other, and the first elastic piece part and the cutter head are provided in a one-to-one correspondence.

Optionally, a plurality of the first elastic piece parts and a plurality of the second elastic piece parts are provided, and the plurality of the first elastic piece parts and the plurality of the second elastic piece parts are alternately arranged in the circumferential direction.

Optionally, the electric shaver is a beard clipper, and the driving component of the beard clipper comprises an ultrasonic amplitude coil and a high-frequency acoustic-wave oscillation circuit, the ultrasonic amplitude coil and the high-frequency acoustic-wave oscillation circuit are both located in the machine body, and the cutter head is in transmission connection with the ultrasonic amplitude coil.

Optionally, the electric shaver is a hair clipper, and the electric shaver further comprises a movable cutter adjuster provided on the wall surface of the machine body, and the movable cutter adjuster is configured to control the operation state of the cutter head.

Optionally, the electric shaver is a hairball trimmer, the cutter head comprises a cutter net assembly, and a transmission assembly is provided in the machine body, the transmission assembly is in transmission connection with the cutter net assembly, and a hairball sticker configured to collect hair balls is further provided in the machine body.

The embodiment of the present disclosure further provides an electric shaver, which comprises a machine body, a head cover assembly, a start-stop controller and a drive assembly, wherein the head cover assembly comprises a cutter net cover and a cutter head provided inside the cutter net cover, the cutter net cover is provided on the machine body, and the start-stop controller and the drive assembly are provided inside the machine body;

- the start-stop controller is connected to the drive assembly, and may be communicated to the cutter net cover, and is configured to control the drive assembly to be started to drive the cutter head to work, or control the drive assembly to be turned off to make the cutter head stop working when detecting that the electrical signal carried by the cutter net cover changes.

The embodiment of the present disclosure further provides a handheld household electrical appliance, which comprises an induction assembly, configured to detect whether the handheld household electrical appliance is in a state of being held by an operator, wherein

- the induction assembly is further configured to detect the distance between the handheld household electrical appliance and the application object; and
- a controller, configured to control operating state of the handheld household electrical appliance according to the handheld state and distance detected by the induction assembly, wherein
- the induction assembly transmits the signal to the PCB board, and introduces the signal into the controller through the PCB board and circuit.

Optionally, the induction assembly is electrically connected to the controller through a shielded wire.

The embodiment of the present disclosure further provides an electric shaver system, which comprises the above-mentioned electric shaver or the handheld household electrical appliance, the electric shaver system further comprises a charging head simultaneously, wherein the charging head is connected to the electric shaver, the charging head is configured to charge the electric shaver, or the charging head is connected to the handheld household electrical appliance, and the charging head is configured to charge the handheld household electrical appliance. The electric shaver system has all the functions of the above-mentioned electric shaver.

The embodiment of the present disclosure further provides a control method, the control method comprises steps of:

- acquiring a touch signal;
- determining whether the touch signal is generated by the human body contacting the cutter head of the electric shaver, wherein when the touch signal is not generated by the human body contacting the cutter head, the driving component is controlled to be turned off, and when the touch signal is generated by the human body contacting the cutter head, the usable duration of the electric shaver is obtained; and
- controlling the driving component of the electric shaver to be started when the usable duration is greater than 0, and controlling the driving component to be turned off when the usable duration is less than 0.

Optionally, after the step of controlling the driving component of the electric shaver to be started, the method further comprises:

- acquiring the current value and the duration of the current value for performing current detection.

Optionally, before the step of acquiring the touch signal, the method further comprises:

- acquiring the charging state of the electric shaver, acquiring the touch signal when the electric shaver is not in the charging state, acquiring the state of the driving component when the electric shaver is in the charging state, and controlling the driving component to be turned off if the driving component is in an on state.

Optionally, after the steps of acquiring the state of the driving component when the electric shaver is in the charging state, and controlling the driving component to be turned off if the driving component is in an on state, the method further comprises:

- acquiring the voltage value of the electric energy storage module of the electric shaver, when the voltage value is greater than or equal to 4.2 v, controlling the electric shaver to stop being charged, and when the voltage value is less than 4.2 v, acquiring the temperature value of the electric energy storage module; and when the temperature value is greater than or equal to 70° C. or less than or equal to −10° C., controlling the electric shaver to stop being charged, and when the temperature value is greater than −10° C. and less than 70° C., acquiring the voltage value of the electric energy storage module, when the voltage value is less than 3.0 v, controlling the electric shaver to be charged with a small current, and when the voltage value is greater than or equal to 3.0 v, controlling the electric shaver to be charged with a constant current.

Compared with the prior art, the embodiments of the present disclosure include, for example, the following beneficial effects.

The embodiments of the present disclosure provide an electric shaver, a handheld household electrical appliance, an electric shaver system and a control method, and the electric shaver includes a machine body and a cutter head that are connected to each other. The machine body includes a housing, a control chip, a driving component, and a handle induction element, the control chip and the driving component are all provided in the housing, and the handle induction element is provided on the housing. The cutter head includes a head portion induction element, the control chip is simultaneously connected to the driving component, the handle induction element and the head portion induction element, and the driving component is also connected to the cutter head, so as to drive the cutter head to work through the driving component. The handle induction element is configured to generate a first induction signal when sensing the proximity of the skin, and send the first induction signal to the control chip. The head portion induction element is configured to generate a second induction signal when sensing the proximity of the skin, and send the second induction signal to the control chip. The control chip is configured to send a driving control signal to the driving component when receiving the first induction signal and the second induction signal, so that the driving component drives the cutter head to work. The electric shaver may automatically start up when both the handle induction element and the head portion induction element sense the proximity of the human body (skin), and the start can be realized without the operation of the user pressing the switch, so the electric shaver is convenient to use and improves the user experience.

BRIEF DESCRIPTION OF DRAWINGS

In order to more clearly illustrate technical solutions in the specific embodiments of the present disclosure or the prior art, accompanying drawings which need to be used for description of the specific embodiments or the prior art will be introduced briefly below, and apparently, the accompanying drawings in the following description merely show some embodiments of the present disclosure, and those ordinarily skilled in the art still could obtain other drawings in light of these accompanying drawings, without using any inventive efforts.

Reference signs: 10—electric shaver; 100—machine body; 110—housing; 111—work end face; 112—drive connection hole; 113—control connection hole; 114—front housing; 115—rear housing; 120—control chip; 121—first controller; 122—signal generator; 123—conductor member; 124—second controller; 130—driving component; 131—motor control switch; 132—motor; 133—motor rotating shaft; 134—transmission shaft assembly; 140—handle induction element; 150—charging interface; 161—power conversion module; 162—charging switch; 163—electric energy storage module; 171—driving gear; 172—driven gear; 190—charging indicator; 200—cutter head; 210—head portion induction element; 211—cutter net cover; 212—inner blade; 213—protective layer; 220—cutter head support; 230—hair storage room; 500—guide assembly; 510—first conductive sheet; 511—conductive support arm; 520—first conductive wire; 530—conduction connection assembly; 531—second conductive sheet; 532—second conductive wire; 540—conduction control assembly; 541—connecting member; 5411—connecting component; 5412—blocking component; 5413—first end; 5414—second end; 542—control member; 5422—elastic component; 550—cutter net contacting elastic piece; 551—first elastic piece part; 5511—first contacting part; 5512—first connecting arm; 5513—second connecting arm; 552—second elastic piece part; 5521—second contacting part; 5522—third connecting arm; 553—connecting ring part; 611—cutter net assembly; 612—ultrasonic amplitude coil; 613—high-frequency acoustic-wave oscillation circuit; 614—transmission assembly; 615—induction module circuit; 618—movable cutter adjuster; 619—hairball sticker.

DETAILED DESCRIPTION OF EMBODIMENTS

The technical solutions of the present disclosure will be clearly and completely described below in combination with the embodiments, and obviously, the embodiments described are part of the embodiments of the present disclosure, rather than all embodiments. Based on the embodiments of the present disclosure, all other embodiments obtained by those ordinarily skilled in the art, without making inventive effort, fall within the protection scope of the present disclosure.

At present, the existing electric shavers all require the user to press the switch separately to start, which is inconvenient to use, based on this point, an electric shaver and an electric shaver system provided by the embodiments of the present disclosure can realize automatic start, which is convenient for the user to use and improves the experience of user.

In order to facilitate the understanding of the present embodiment, an electric shaver disclosed in the embodiment of the present disclosure is first introduced in detail.

The embodiment of the present disclosure provides an electric shaver 10, the electric shaver 10 may be a beard clipper, a hair clipper, or an electric shaving equipment for other purposes.

Figure 1:
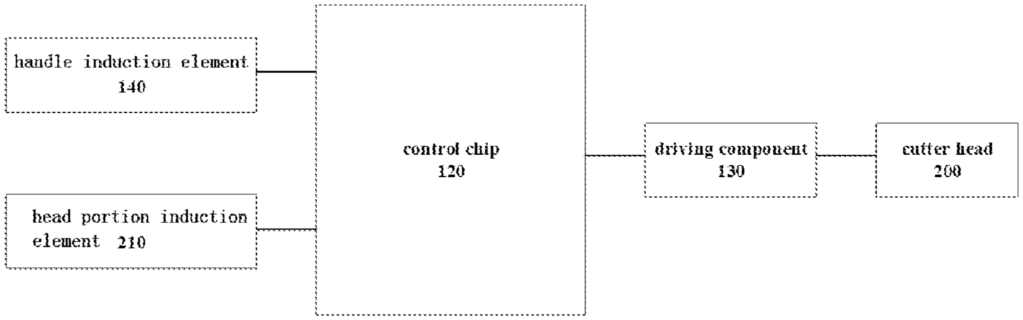
FIG. 1 is a structural schematic view of an electric shaver provided by an embodiment of the present disclosure.
Figure 2:
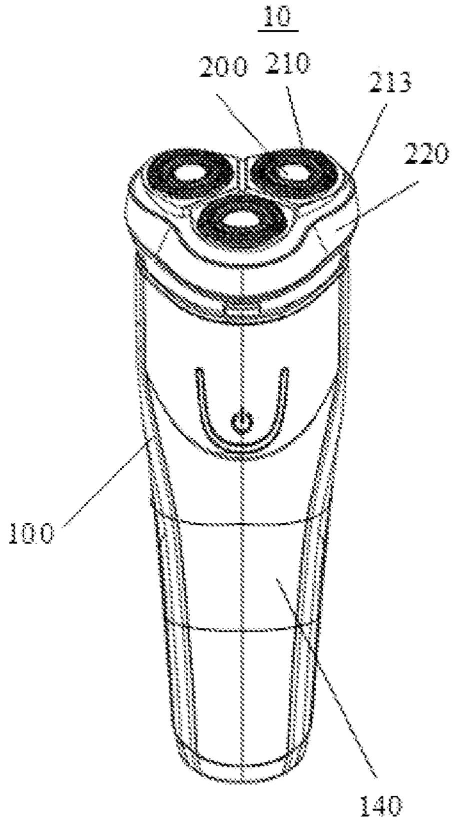
FIG. 2 is a schematic view of external structure of the first electric shaver provided by an embodiment of the present disclosure.
Figure 3:
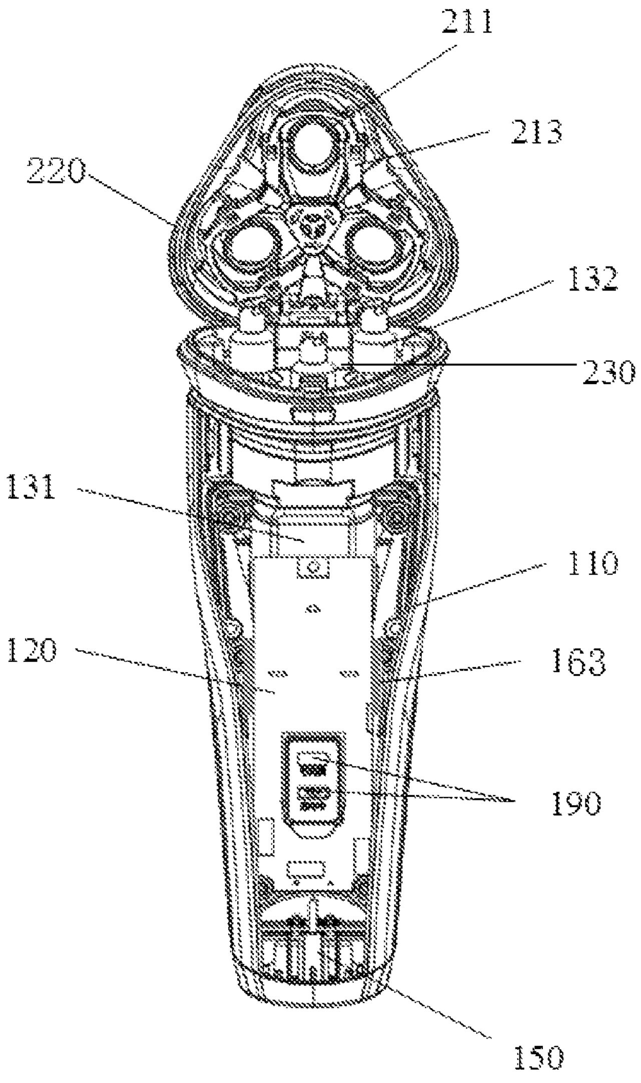
FIG. 3 is a schematic view of internal structure of the first electric shaver provided by an embodiment of the present disclosure.
Figure 4:
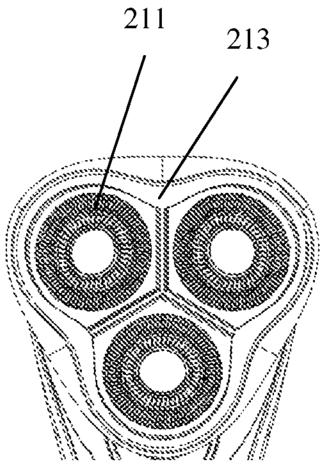
FIG. 4 is a top view of the cutter head of the first electric shaver provided by an embodiment of the present disclosure.

Referring to the structural schematic view of the electric shaver 10 shown in FIG. 1, the schematic view of external structure of the first electric shaver 10 shown in FIG. 2, the schematic view of internal structure of the first electric shaver 10 shown in FIG. 3 and the top view of the cutter head of the first electric shaver 10 shown in FIG. 4, the electric shaver 10 provided by the present disclosure includes a machine body 100 and a cutter head 200 that are connected to each other. The machine body 100 includes a housing 110, a control chip 120 and a driving component 130 that are provided in the housing 110, and a handle induction element 140 provided on the housing 110, in other words, the machine body 100 includes the housing 110, the control chip 120, the driving component 130 and the handle induction element 140, the control chip 120 and the driving component 130 are both provided inside the housing 110, and the handle induction element 140 is provided on the housing 110. The cutter head 200 comprises a head portion induction element 210. The control chip 120 is simultaneously connected to the driving component 130, the handle induction element 140 and the head portion induction element 210, and the driving component 130 is also connected to the cutter head 200, so that the driving component 130 drives the cutter head 200 to work under the control of the control chip 120. It should be noted that the control chip 120 is also the controller, since the control chip 120 may control the cutter head 200 to start and stop, the control chip 120 may also be called a start-stop controller in some embodiments.

The first electric shaver 10 is a beard clipper, and the structure of the electric shaver 10 is described in detail below by taking the first electric shaver 10 as an example.

Referring to FIG. 1-FIG. 4 in combination, the handle induction element 140 is provided at the handle position of the machine body 100 (that is, the position where the hand grasps), and the handle induction element 140 is configured to generate a first induction signal when sensing the proximity of the skin, and send the first induction signal to the control chip 120. The head induction element 210 is configured to generate a second induction signal when sensing the proximity of the skin, and send the second induction signal to the control chip 120; and the control chip 120 is configured to send a driving control signal to the driving component 130 when receiving the first induction signal and the second induction signal, so that the driving component 130 drives the cutter head 200 to work.

Specifically, the handle induction element 140 may also be called a second sensor, the head portion induction element 210 may also be called a first sensor, simultaneously, the handle induction element 140 and the head portion induction element 210 may be collectively called as an induction assembly, in other words, the electric shaver 10 includes the induction assembly, and the induction assembly comprises the handle induction element 140 and the head portion induction element 210. The handle induction element 140 is configured to detect whether the electric shaver 10 is in the state of being held by the operator, when the handle induction element 140 detects that the electric shaver 10 is in the handheld state, the handle induction element 140 generates a first induction signal and sends the first induction signal to the control chip 120, in other words, when the handle induction element 140 detects that the distance between the electric shaver 10 and the operator at the handle induction element 140 is almost zero, the control chip 120 obtains the first induction signal. It can be understood that, in other embodiments, the distance value, corresponding to the first induction signal, between the electric shaver 10 and the operator can also be set according to requirements.

The second induction signal is the signal generated when the electrical signal carried on the head portion induction element 210 changes, specifically, the change in the electrical signal mainly refers to the change in the capacitance, since the human body itself carries a certain capacitance, when the human body approaches the head portion induction element 210, the capacitance of the head portion induction element 210 increases, and the signal is the second induction signal.

Optionally, the electric shaver 10 further includes a printed circuit board (PCB board), and the head portion induction element 210, the handle induction element 140 and the control chip 120 are respectively connected to the PCB board, during use, the head portion induction element 210 and the handle induction element 140 transmit the signal to the PCB board, and the signal is introduced into the control chip 120 through the circuit of the PCB board.

Optionally, the above-mentioned handle induction element 140 includes a first induction coil provided on the inner wall of the housing 110. As shown in FIG. 2 to FIG. 4, the cutter head 200 includes a cutter net cover 211, specifically, the cutter net cover 211 may also be referred to as a metal cutter net. The head portion induction element 210 includes a cutter net cover 211 and/or a second induction coil provided around the cutter net cover 211.

Since the handle induction element 140 and the head portion induction element 210 are both induction coils, and the human body is a conductor, based on the working principle of the antenna, both the handle induction element 140 and the head portion induction element 210 can generate an induction electrical signal when the human body approaches, so as to realize the automatic starting of the electric shaver, in which the realizing principle is stable and reliable. It can be understood that in other embodiments, the specific structures of the handle induction element 140 and the head portion induction element 210 can also be provided according to requirements, for example, the handle induction element 140 is provided as the handle induction element 140 or a pressure sensor, or the head portion induction element 210 is provided as an infrared sensor.

When the handle induction element 140 is the infrared sensor, the infrared sensor can convert a hand infrared characteristic signal, when the operator holds, into electrical signal, and transmit the electrical signal to the control chip 120. When the handle induction element 140 is a pressure sensor, the pressure sensor can convert a pressure when the operator holds into electrical signal, and transmit the electrical signal to the control chip 120. When the head portion induction element 210 is the infrared sensor, the infrared sensor can perform distance detection, and can judge the infrared characteristics of the application object at the same time, so as to detect whether the object close to the head portion induction element 210 is the preset application object, specifically, the electric shaver 10 is the beard clipper, so the preset application object at this time is the human body.

In addition, the control chip 120 is also configured to send a shutdown control signal to the driving component 130 during the operation of the cutter head 200, so that the driving component 130 stops driving the cutter head 200, when the first induction signal and the second induction signal are not received, or only one of the first induction signal and the second induction signal is received, that is, when the control chip 120 does not receive at least one of the first induction signal and the second induction signal. In this way, the automatic shutdown function of the electric shaver 10 is realized, and the electric energy can also be saved at the same time.

Specifically, the material of the above-mentioned housing 110 may be, but is not limited to, plastic. The control chip 120 may be an MCU (Microcontroller Unit). For example, the control chip 120 is a single chip microcomputer, and the model of the control chip 120 may be, but is not limited to, PL51T020. The number of cutter heads 200 may be one or multiple, as shown in FIG. 4, in this embodiment, the number of cutter heads 200 is three, however, the number of cutter heads 200 is not limited herein, it can be understood that, in other embodiments, for example, the number of the cutter heads 200 may be provided as one, two, four or the like. The control chip 120 may be respectively connected to the driving component 130, the handle induction element 140 and the head portion induction element 210 through transmission conductors (for example, transmission lines).

Optionally, the electric shaver 10 further includes a cutter head support 220 configured to fix the cutter head 200, the cutter head support 220 is connected to the machine body 100, and a hair storage room 230 is formed between the cutter head support 220 and the machine body. The three cutter heads 200 are evenly distributed on the cutter head support 220, specifically, the cutter heads 200 are circular, and the circle centers of the three cutter heads 200 are connected in sequence to form a shape that is roughly an equilateral triangle.

The above-mentioned electric shaver 10 may automatically start up when both the handle induction element 140 and the head portion induction element 210 sense the proximity of a human body (skin), and may be automatically turned off, when at least one of the handle induction element 140 and the head portion induction element 210 senses that the human body (skin) is moving away, and the user does not need to press the switch separately, so the electric shaver is convenient to use and improves the user's experience.

The above-mentioned electric shaver 10 also has a mistaken touch preventing function, wherein the electric shaver may automatically start up only when the handle induction element 140 and the head portion induction element 210 sense the proximity of the human body simultaneously, that is, when the user only approaches one of the handle induction element 140 and the head portion induction element 210, the electric shaver 10 will not run or start up, thus effectively avoiding touch by mistake, and the structure design is more reasonable.

In addition, the overall appearance of the above-mentioned electric shaver 10 does not have any buttons or push switches, which is more conducive to waterproofing.

It can be understood that the first electric shaver 10 can also realize the function of automatic starting and stopping without the need for the user to press the switch separately by only providing the handle induction element 140 or the head portion induction element 210.

Optionally, the handle induction element 140 includes a first induction coil provided on the inner wall of the housing 100. The cutter head 200 has a cutter net cover 211, in the embodiment of the present disclosure, the cutter net cover 211 is used as the head portion induction element 210. Specifically, the electric shaver 10 provided in this embodiment will be described below by using the cutter net cover 211 as the head portion induction element 210.

In another possible embodiment, a second induction coil may be provided around the cutter net cover 211, and the second induction coil is used as the head portion induction element 210.

In yet another possible embodiment, both the cutter net cover 211 and the second induction coil are used as the head portion induction element 210, and the cutter net cover 211 and the second induction coil are respectively connected to the control chip 120, when receiving a signal sent by at least one of the cutter net cover 211 and the second induction coil, the control chip 120 determines that the second induction signal generated by the head portion induction element 210 is received. In this way, the head portion induction element 210 has a larger area, can sense the proximity of the human body in time, and thus has high sensitivity.

Optionally, the material of the above-mentioned first induction coil includes at least one of copper, steel, iron, aluminum, zinc and nickel, for example, the material of the first induction coil is provided as copper, steel, iron, aluminum, zinc or nickel, or the material of the first induction coil is provided as any two of copper, steel, iron, aluminum, zinc and nickel; and the material of the above-mentioned second induction coil also includes at least one of copper, steel, iron, aluminum, zinc and nickel, for example, the material of the second induction coil is provided as copper, steel, iron, aluminum, zinc or nickel, or the material of the second induction coil is provided as any two of copper, steel, iron, aluminum, zinc and nickel.

Optionally, in order to improve safety, as shown in FIG. 2 to FIG. 4, the above-mentioned head portion induction element 210 is covered with a protective layer 213, for example, the second induction coil is covered by the protective layer 213, specifically, part of the protective layer 213 is located inside the cutter head support 220, and the rest part of the protective layer 213 is located outside the cutter head support 220. The protective layer 213 may be, but is not limited to, a plastic piece. Optionally, the material of the protective layer 213 is soft rubber, in this case, the protective layer 213 can be referred to as a skin-feeling support, and the skin-feeling support has a better touch feeling, which can further improve the experience feeling of the user.

Figure 5:
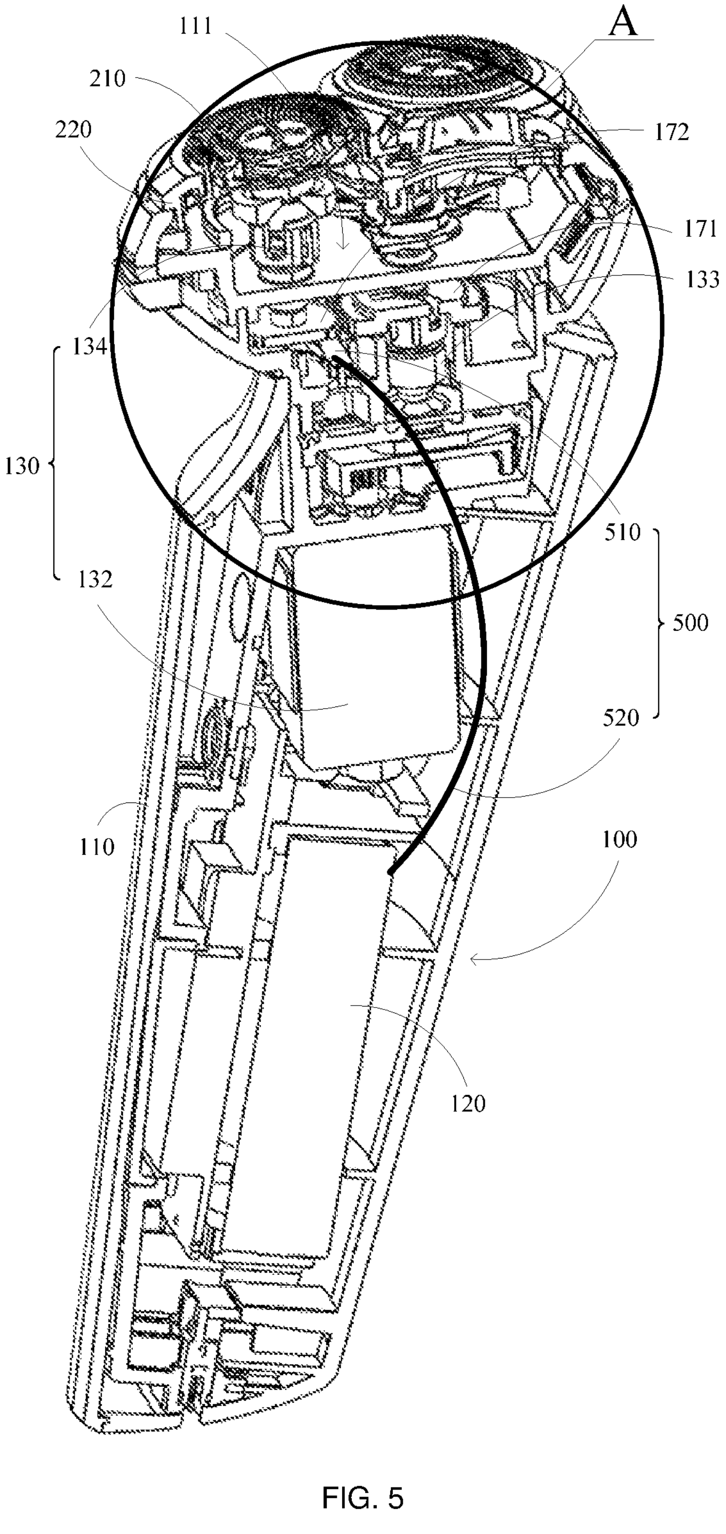
FIG. 5 is a schematic view of sectional structure of a second electric shaver provided by an embodiment of the present disclosure.
Figure 6:
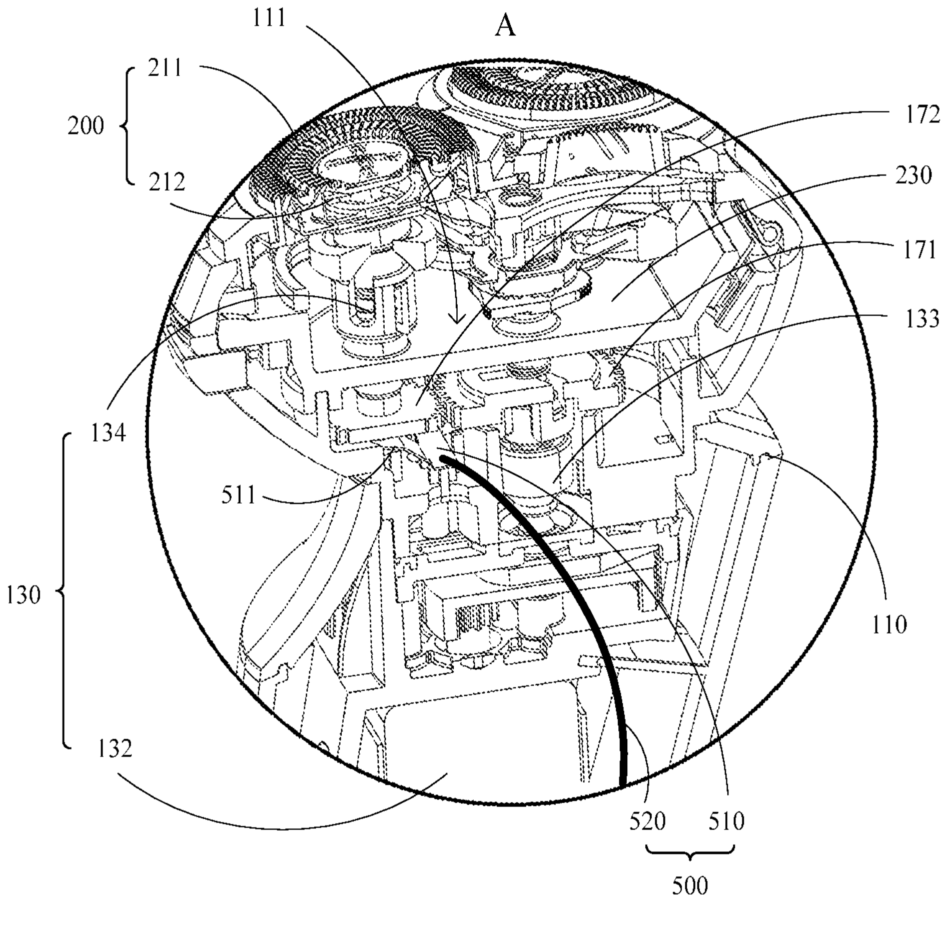
FIG. 6 is an enlarged schematic view of a partial structure at A in FIG. 5.

FIG. 5 shows a schematic view of sectional structure of a second electric shaver 10 provided by an embodiment of the present disclosure, and FIG. 6 shows an enlarged schematic view of a partial structure at A in FIG. 5. FIG. 5 and FIG. 6 show the second electric shaver 10 provided by the embodiment of the present disclosure, in the second electric shaver 10, the head portion induction element 210 and the driving component 130 are both connected to the control chip 120, and the control chip 120 is configured to control the driving component 130 to be started when receiving a signal from the head portion induction element 210. Specifically, the head portion induction element 210 is the cutter net cover 211 of the cutter head 200, when detecting that the electrical signal carried on the cutter net cover 211 changes, the control chip 120 controls the driving component 130 to be started, so as to drive the cutter head 200 to work, or the control chip 120 controls the driving component 130 to be turned off, so that the cutter head 200 stops working.

The cutter head 200 further includes an inner blade 212, the inner blade 212 is provided inside the cutter net cover 211, and the driving component 130 is connected to the inner blade 212. The cutter net cover 211 is configured to cooperate with the inner blade 212 to cut hair (hair, beard or the like), and prevent the skin from being cut. The inner blade 212 is configured to move relative to the cutter net cover 211 under the driving of the driving component 130 to cut hair and the like. The control chip 120 is communicated to the cutter net cover 211, and when detecting that the electrical signal carried on the cutter net cover 211 changes, the driving component 130 is controlled to be started, thereby driving the inner blade 212 to work, or the driving component 130 is controlled to be turned off, thereby making the inner blade 212 stop working.

Specifically, when the electrical signal received by the control chip 120 represents an increase in capacitance, that is, when the human body approaches the cutter net cover 211 on the cutter head 200, the driving component 130 is started under the control of the control chip 120, thereby driving the inner blade 212 to work; and when the electrical signal received by the control chip 120 represents a decrease in capacitance, that is, when the human body is moving away from the cutter net cover 211 on the cutter head 200, the driving component 130 is turned off under the control of the control chip 120, thereby making the inner blade 212 to stop working.

It should be noted that, in other embodiments, the cutter head 200 may also be called a head cover assembly, simultaneously, when the cutter head 200 of this embodiment is called a head cover assembly, correspondingly, the inner blade 212 of this embodiment can also be referred to as a cutter head, that is, the cutter head 200 in this embodiment includes the cutter net cover 211 and the inner blade 212, which can be regarded as equivalent to the head cover assembly in other embodiments including the cutter net cover and the cutter head. Simultaneously, the driving component 130 may also be referred to as the drive assembly.

Therefore, in a certain embodiment, the electric shaver 10 can also be regarded as including a machine body, a head cover assembly, a start-stop controller and a drive assembly, and in this case, the machine body can be regarded as equivalent to the above-mentioned housing 110. The head cover assembly includes a cutter net cover and a cutter head provided inside the cutter net cover, the cutter net cover is provided on the machine body, and the start-stop controller and the drive assembly are provided inside the machine body. The start-stop controller is connected to the drive assembly, and the start-stop controller may be communicated to the cutter net cover, so that the start-stop controller controls the drive assembly to be started to drive the cutter head to work when detecting that the electrical signal carried on the cutter net cover changes, or the start-stop controller controls the drive assembly to be turned off, so that the cutter head stops working.

Figure 7:
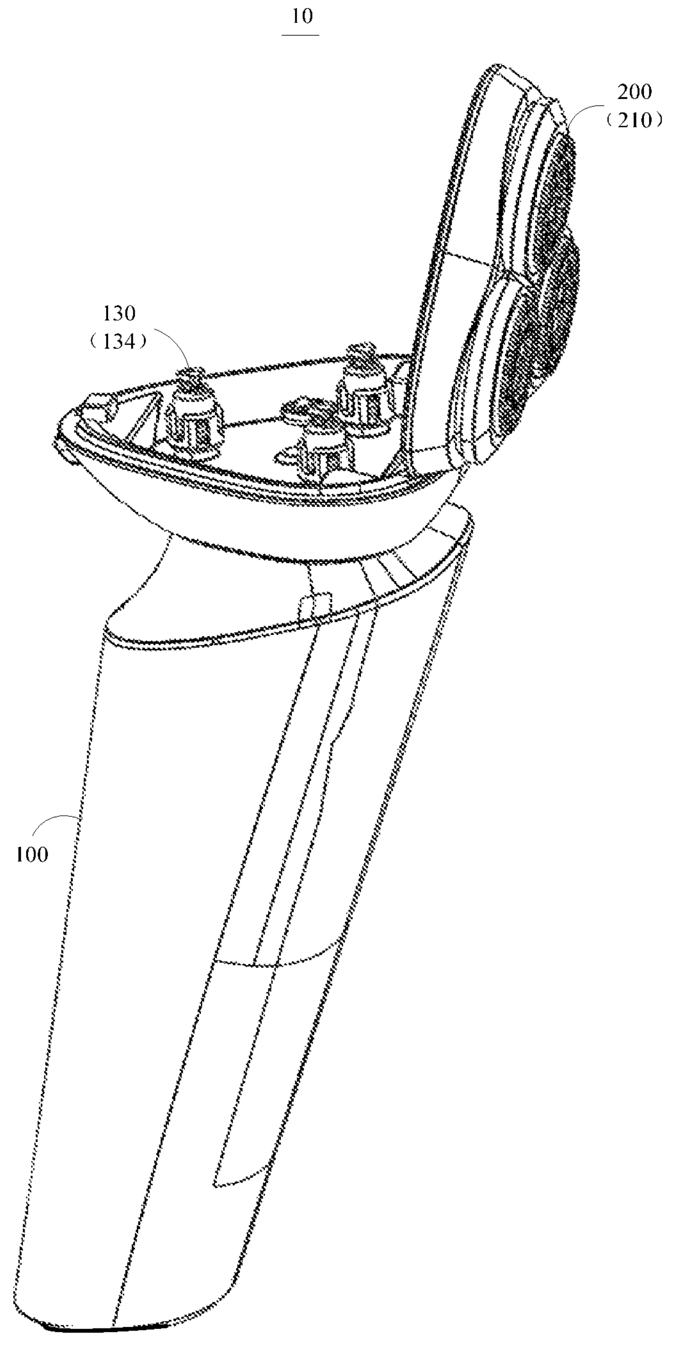
FIG. 7 is a schematic view of outline structure of the second electric shaver provided by the embodiment of the present disclosure when it is in an on state.
Figure 8:
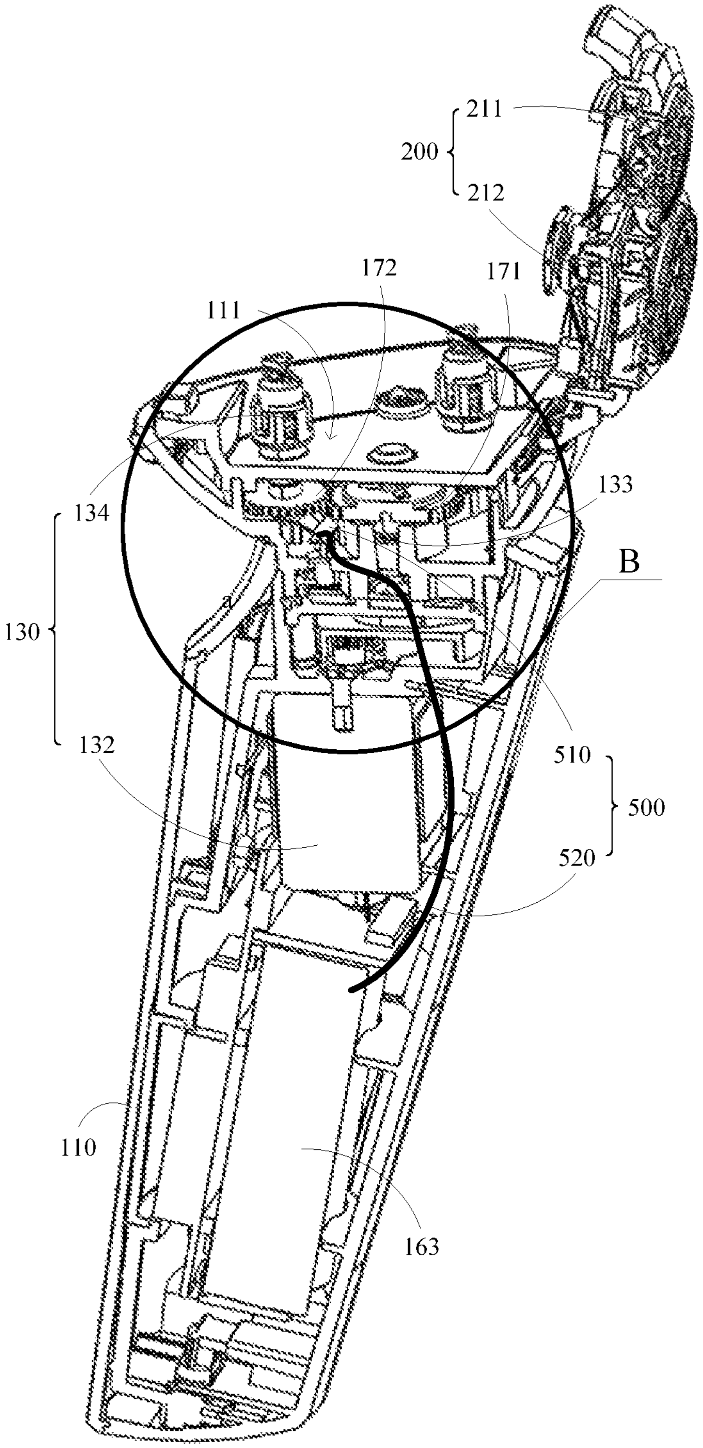
FIG. 8 is a schematic view of sectional structure of the second electric shaver provided by the embodiment of the present disclosure when it is in an on state.
Figure 9:
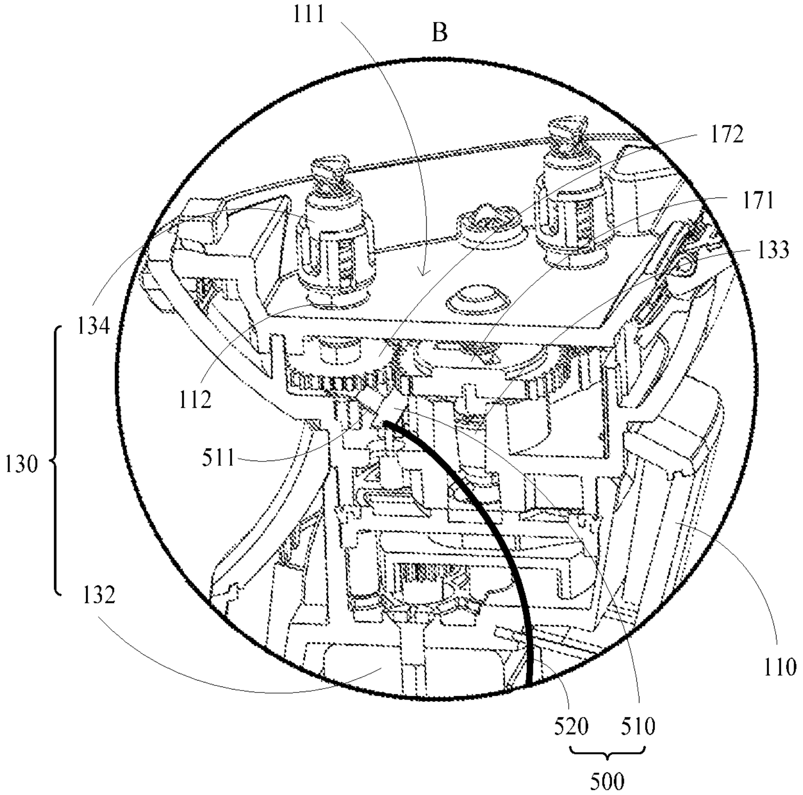
FIG. 9 is an enlarged schematic view of a partial structure at B in FIG. 8.
Figure 10:
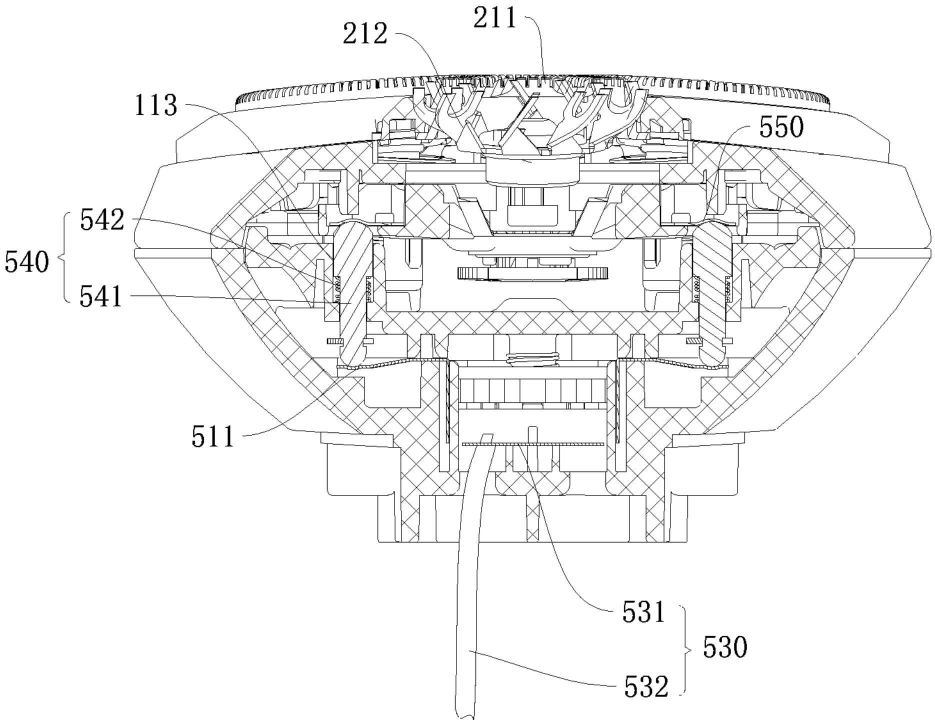
FIG. 10 is a sectional structure schematic view of partial structure of the second electric shaver provided by the embodiment of the present disclosure when it is in a closed state.
Figure 11:
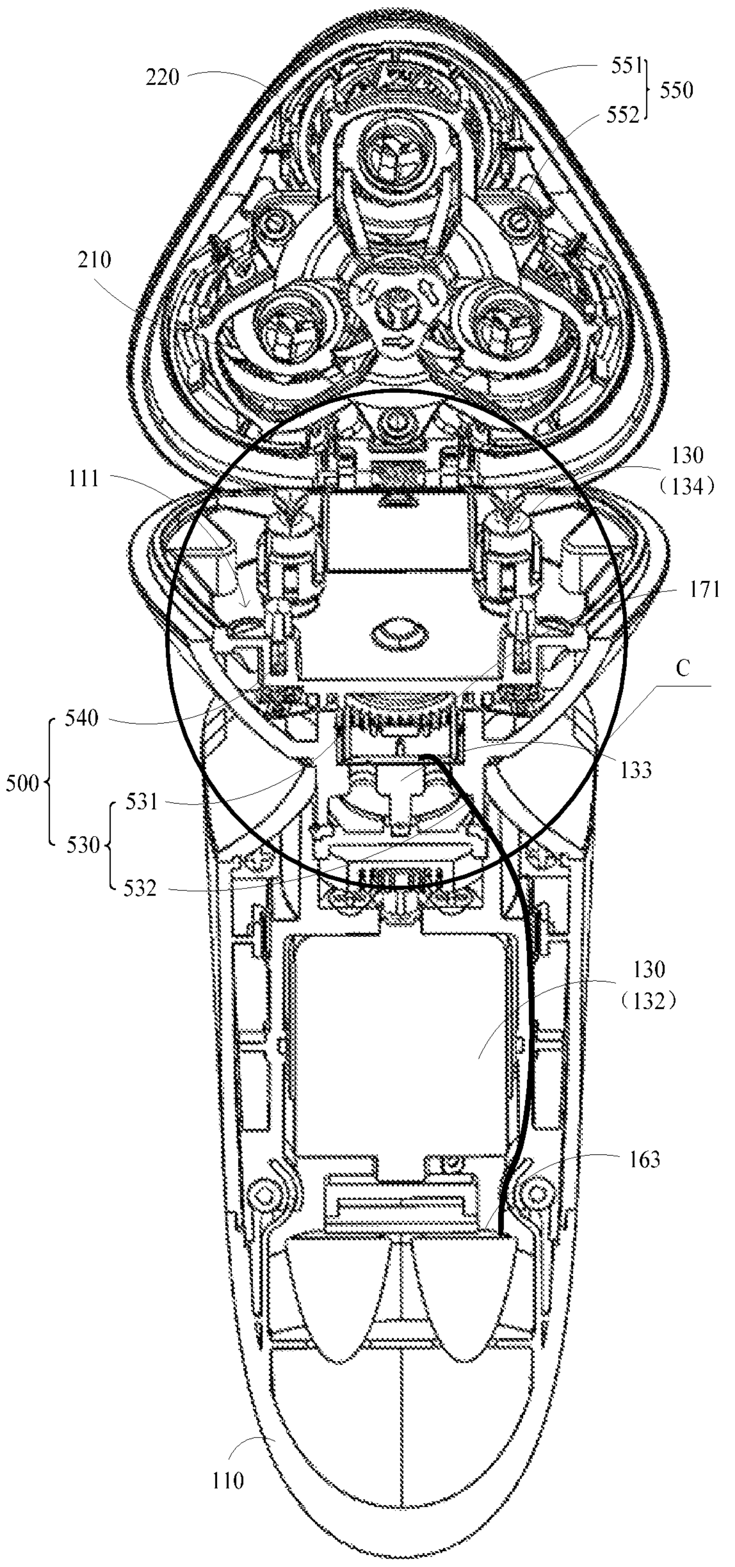
FIG. 11 is a schematic view of sectional structure of the second electric shaver provided by the embodiment of the present disclosure when it is in an opened state.
Figure 12:
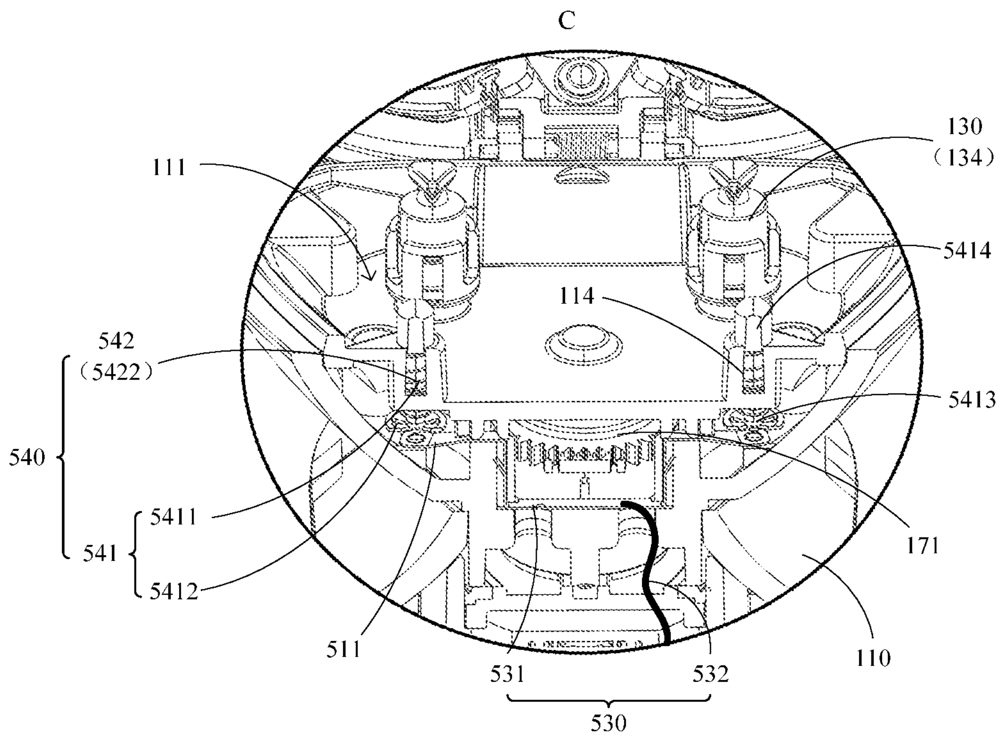
FIG. 12 is an enlarged schematic view of a partial structure at C in FIG. 11.
Figure 13:
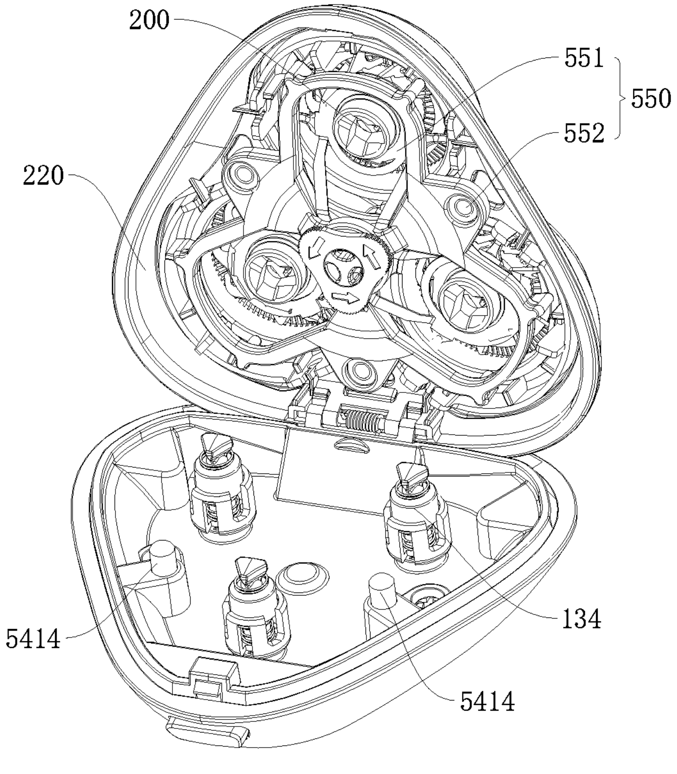
FIG. 13 is a schematic view of partial structure of the second electric shaver provided by the embodiment of the present disclosure when it is in an opened state.

FIG. 7 is a schematic view of outline structure of the second electric shaver 10 provided by the embodiment of the present disclosure when the second electric shaver is in an on-state, and FIG. 8 is a schematic view of sectional structure of the second electric shaver 10 provided by the embodiment of the present disclosure when the second electric shaver is in an on-state, FIG. 9 is an enlarged schematic view of a partial structure at B in FIG. 8. Referring to FIG. 1 to FIG. 9 in combination, in the first electric shaver 10 and the second electric shaver 10 provided by the embodiments of the present disclosure, the cutter head 200 is movably connected to the machine body 100, the cutter head 200 may be closed (as shown in FIG. 4 to FIG. 6, the electric shaver 10 is in the closed state at this time) or opened (as shown in FIG. 7 to FIG. 9, the electric shaver 10 is in the opened state at this time) relative to the machine body 100. Optionally, the cutter head 200 is rotatably connected to the machine body 100, so that the cutter head 200 may be switched in a state of being closed or opened relative to the machine body 100 through rotation.

It should be noted that since the cutter net cover 211 is a part of the cutter head 200, it can also be regarded as that the cutter net cover 211 may be closed or opened relative to the machine body 100, wherein the cutter head 200 is closed relative to the machine body 100, that is, the cutter net cover 211 is closed relative to the machine body 100, and the cutter head 200 is opened relative to the machine body 100, that is, the cutter net cover 211 is opened relative to the machine body 100.

When the cutter head 200 is closed relative to the machine body 100, the driving component 130 is in transmission connection to the cutter head 200, at this time, the driving component 130 may drive the cutter head 200 to work; and when the cutter head 200 is opened relative to the machine body 100, the driving component 130 is separated from the cutter head 200, and at this time the driving component 130 is disconnected from the cutter head 200, even if the driving component 130 is started, the cutter head 200 cannot be driven to work. Based on this, the situation that the user touches by mistake the cutter net cover 211, so that the electric shaver 10 automatically starts up, when the cutter head 200 is opened relative to the machine body 100 and the driving component 130 is moved away from the cutter head 200 is avoided.

The second electric shaver 10 provided in the embodiment of the present disclosure further includes a guide assembly 500, the guide assembly 500 is connected to the control chip 120, and when the cutter head 200 is closed relative to the machine body 100, the guide assembly 500 is communicated to the cutter net cover 211, so that the control chip 120 is communicated to the cutter net cover 211, that is, the control chip 120 is communicated to the head portion induction element 210; and when the cutter head 200 is opened relative to the machine body 100, the guide assembly 500 is disconnected from the cutter net cover 211, so that the control chip 120 is disconnected from the cutter net cover 211, that is, the control chip 120 is disconnected from the head portion induction element 210.

Obviously, by providing the guide assembly 500 connected to the control chip 120, when the cutter head 200 is closed relative to the machine body 100, the structure in which the guide assembly 500 is communicated to the cutter net cover 211 may also be applied to the electric shaver 10 (for example, the first electric shaver 10) provided with the head portion induction element 210 and the handle induction element 140 simultaneously.

Referring to FIG. 7-FIG. 9 in combination, in the embodiment of the present disclosure, the driving component 130 includes a motor 132 (also referred to as an electrical machinery) and a transmission shaft assembly 134, the transmission shaft assembly 134 is in transmission connection with the motor 132, and the motor 132 is connected to the control chip 120, so as to control the starting and stopping of the motor 132 through the control chip 120. Optionally, a drive connection hole 112 communicated with the inner cavity of the housing 110 is provided on the end surface of one end of the housing 110, and the end surface is the working end surface 111 of the housing 110, when the cutter head 200 is closed relative to the machine body 100, a hair storage room 230 is formed between the working end surface 111 and the cutter head support 220, and the hair storage room 230 is configured to store the hair cut by the cutter head 200.

The transmission shaft assembly 134 is provided on the working end surface 111, and the transmission shaft assembly 134 passes through the drive connection hole 112 to be in transmission connection with the motor 132 provided in the inner cavity of the housing 110. When the cutter head 200 is closed relative to the machine body 100, the transmission shaft assembly 134 is in transmission connection with the cutter head 200, so that the power of the motor 132 is transmitted to the inner blade 212 through the transmission shaft assembly 134, so that the inner blade 212 works; and when the cutter head 200 is opened relative to the machine body 100, the transmission shaft assembly 134 is separated from the cutter head 200.

Optionally, the transmission shaft assembly 134 and the cutter head 200 are provided in a one-to-one correspondence, in this embodiment, the number of the transmission shaft assembly 134 is three, it can be understood that in other embodiments, the number of the transmission shaft assembly 134 is correspondingly provided according to the number of the cutter head 200, for example, when the number of cutter head 200 is one, the number of transmission shaft assembly 134 is correspondingly provided to one; and when the number of cutter head 200 is two, the number of transmission shaft assembly 134 is correspondingly provided to two.

Simultaneously, it can be understood that when one transmission shaft assembly 134 is provided, the motor 132 may be directly connected to the transmission shaft assembly 134 through motor rotating shaft 133, when the number of the transmission shaft assembly 134 is more than one, an intermediate transmission member may be provided to achieve one motor 132 is in transmission connection with a plurality of transmission shaft assembly 134. As shown in FIG. 8 and FIG. 9, the intermediate transmission member includes a driving gear 171 and a driven gear 172. The driving gear 171 is connected to the motor rotating shaft 133 of the motor 132, and the motor 132 controls the rotation of the driving gear 171 through the motor rotating shaft 133. The number of the driven gear 172 is multiple, the driving gear 171 meshes with the plurality of driven gears 172 at the same time, and each driven gear 172 has also a unique corresponding transmission shaft assembly 134 connected thereto.

Based on the above arrangement, in the embodiment of the present disclosure, if the transmission shaft assembly 134 is made of a conductor material, the guide assembly 500 may be connected to the control chip 120 and the transmission shaft assembly 134 at the same time, so that when the cutter head 200 is closed relative to the machine body 100, and the transmission shaft assembly 134 is cooperated with the cutter head 200, the control chip 120 is communicated to the head portion induction element 210 through the guide assembly 500, the transmission shaft assembly 134 and the inner blade 212 in sequence, that is, the second induction signal of the head portion induction element 210 is sequentially transmitted along the inner blade 212, the transmission shaft assembly 134 and the guide assembly 500, and finally transmitted to the control chip 120. When the cutter head 200 is opened relative to the machine body 100, and the transmission shaft assembly 134 is separated from the cutter head 200, the transmission shaft assembly 134 is disconnected from the cutter head 200, that is, the transmission shaft assembly 134 is disconnected from the inner blade 212, so that the transmission shaft assembly 134 is indirectly disconnected from the cutter net cover 211, thereby making the control chip 120 disconnected from the cutter net cover 211.

Optionally, as shown in FIG. 8 and FIG. 9, as for the guide assembly 500, in the embodiment of the present disclosure, as a first optional embodiment, it may include a first conductive sheet 510 and a first conductive wire 520. The first conductive sheet 510 is connected to the transmission shaft assembly 134, and two ends of the first conductive wire 520 are respectively connected to the control chip 120 and the first conductive sheet 510, that is, the control chip 120 is communicated to the transmission shaft assembly 134 through the first conductive wire 520 and the first conductive sheet 510 in sequence, when the transmission shaft assembly 134 is communicated to the cutter net cover 211, the control chip 120 is communicated to the cutter net cover 211.

Optionally, the first conductive wire 520 is a shielded wire. The shielded wire can reduce or even avoid the influence of the external magnetic field on the communication line. Using the shielded wire as the first conductive wire 520 not only can achieve that the control chip 120 is communicated to the transmission shaft assembly 134, but also can avoid the situation that the false induction occurs.

Optionally, the first conductive sheet 510 has conductive support arms 511, the number of the conductive support arm 511 is multiple, and a plurality of conductive support arms 511 are all configured to be connected to the transmission shaft assembly 134, so as to improve the error-tolerant rate, that is, when a certain conductive support arm 511 is separated from the transmission shaft assembly 134 and cannot be communicated, the remaining conductive support arms 511 can still ensure that the guide assembly 500 is communicated to the transmission shaft assembly 134, which helps to improve the reliability of use. In the embodiment of the present disclosure, as shown in FIG. 6, the number of the conductive support arm 511 is two, and one ends of the two conductive support arms 511 are connected to each other to form an "L"-shaped first conductive sheet 510, the first conductive wire 520 is connected to the connecting portion of the two conductive support arms 511.

Optionally, the first conductive sheet 510 and the transmission shaft assembly 134 are away from one end of the cutter head 200. It can be understood that when the driven gear 172 is made of conductive material, the first conductive sheet 510 can also be connected to the driven gear, so as to indirectly realize the connection with the transmission shaft assembly 134.

In the above configuration, since the guide assembly 500 is disconnected from the cutter head 200, when the cutter head 200 is opened relative to the machine body 100 and the transmission shaft assembly 134 is away from the cutter head 200, so that the guide assembly 500 is disconnected from the cutter net cover 211, and the control chip 120 is disconnected from the cutter net cover 211, therefore, when the cutter head 200 is opened relative to the machine body 100, even if the user touches the cutter net cover 211 by mistake, the electric shaver 10 will not automatically start up, thereby enhancing the use safety of the electric shaver 10. However, it should be noted that when the cutter head 200 is opened relative to the machine body 100, and the user touches by mistake the part of the transmission shaft assembly 134 located outside the machine body 100 and configured to cooperate with the cutter head 200, the electric shaver 10 may still automatically start up.

Therefore, in order to avoid the above-mentioned situation, referring to FIG. 10-FIG. 13, in the embodiment of the present disclosure, as a second optional embodiment, the guide assembly 500 includes a conduction connection assembly 530 and a conduction control assembly 540, the conduction connection assembly 530 is provided inside the housing 110 (that is, inside the machine body 100), and connected to the control chip 120.

In the embodiment of the present disclosure, the conduction control assembly 540 may be provided on the machine body 100, and when the cutter head 200 is closed relative to the machine body 100, the conduction control assembly 540 is communicated to the head portion induction element 210 and the conduction connection assembly 530 at the same time, so that the control chip is communicated to the head portion induction element 210 through the conduction connection assembly 530 and the conduction control assembly 540 in sequence. When the cutter head 200 is opened relative to the machine body 100, the conduction control assembly 540 is away from the cutter head 200, so that the control chip 120 is disconnected from the head portion induction element 210.

Optionally, the conduction control assembly 540 is provided at one end of the working end surface 111 of the housing 110, and the conduction connection assembly 530 may include a second conductive sheet 531 and a second conductive wire 532, and the second conductive sheet 531 is connected to one end of the conduction control assembly 540 away from the cutter head 200, and the second conductive wire 532 is connected to the control chip 120 and the second conductive sheet 531 at the same time, so that when the conduction control assembly 540 is communicated to the head portion induction element 210 of the cutter head 200, the control chip 120 is communicated to the head portion induction element 210 through the second conductive wire 532, the second conductive sheet 531 and the conduction control assembly 540 in sequence.

Optionally, the second conductive wire 532 is a shielded wire. The shielded wire can reduce or even avoid the influence of the external magnetic field on the communication line, using the shielded wire as the second conductive wire 532 not only can achieve that the control chip 120 is communicated to the conduction control assembly 540, but also can avoid the situation that the false induction occurs.

Furthermore, in order to facilitate the arrangement of the conduction control assembly 540, in the embodiment of the present disclosure, a control connection hole 113 may also be provided on the working end surface 111 of the housing 110, and the conduction control assembly 540 includes a connecting member 541 and a control member 542, wherein the connecting member 541 passes through the control connection hole 113 so that one end of the connecting member 541 extends into the interior of the housing 110, and this end is the first end 5413 of the connecting member 541, in other words, the first end 5413 of the connecting member 541 is located in the housing 110; one end of the connecting member 541 protrudes from the working end surface 111 to be located outside the housing 110, this end is the second end 5414 of the connecting member 541, and the second end 5414 is configured to be communicated to the head portion induction element 210. Specifically, when the cutter head 200 is closed relative to the machine body 100, the second end 5414 is communicated to the cutter head 200, so that the connecting member 541 is communicated to the head portion induction element 210.

The control member 542 is provided on the connecting member 541, when the cutter head 200 is closed relative to the machine body 100, the second end 5414 of the connecting member 541 is communicated to the head portion induction element 210, the first end 5413 of the connecting member 541 is communicated to the conduction connection assembly 530 simultaneously, so as to be communicated to the control chip 120 through the conduction connection assembly 530. When the cutter head 200 is opened relative to the machine body 100, the second end 5414 of the connecting member 541 is disconnected from the head portion induction element 210, and at the same time, the control member 542 makes the first end 5413 disconnected from the conduction connection assembly 530, in this way, the control chip 120 is disconnected from both the connecting member 541 and the head portion induction element 210. In this way, when the cutter head 200 is opened relative to the machine body 100, even if the head portion induction element 210 or the connecting member 541 is touched by mistake, the second induction signal cannot be generated, and the second induction signal cannot be sent to the control chip 120, therefore, there will be no situation that the driving component 130 is activated by mistake.

Continuing to refer to FIG. 10-FIG. 13, as for the connecting member 541, in the embodiment of the present disclosure, as an optional embodiment, it may include a connecting component 5411 and a blocking component 5412. The connecting component 5411 passes through the control connection hole 113, and one end of the connecting component 5411 is located inside the housing 110, that is, this end of the connecting component 5411 may be regarded as the first end 5413 of the connecting member 541; the other end of the connecting component 5411 is located outside the housing 110, that is, this end of the connecting component 5411 can be regarded as the second end 5414 of the connecting member 541. The blocking component 5412 is provided at one end of the connecting component 5411 located inside the machine body 100, that is, the blocking component 5412 is provided at the first end 5413, and the blocking component 5412 is configured to abut against the housing 110 to prevent the connecting member 541 from being separated from the housing 110.

Specifically, the blocking component 5412 is sleeved over the first end 5413, and a clamping groove is provided on the first end 5413 for snapping the blocking component 5412, so that the blocking component 5412 is fixed to the connecting component 5411. The control connection hole 113 has a first opening communicating with the inner cavity of the housing 110, and the cross-sectional area of the blocking component 5412 is larger than the cross-sectional area of the first opening, therefore, when the connecting component 5411 has a tendency of moving outward relative to the control connection hole 113, the blocking component 5412 abuts against the inner wall of the housing 110 to prevent the connecting component 5411 from continuing to move outward, thereby preventing the connecting member 541 from moving to the outside of the housing 110 as a whole, which leads to a situation that the connecting member 541 is separated from the housing 110.

As for the control member 542, in the embodiment of the present disclosure, as an optional embodiment, it may include an elastic component 5422. The elastic component 5422 is connected to the connecting member 541, and the elastic component 5422 is configured so that the connecting member 541 has a tendency of moving away from the conduction connection assembly 530, in this way, when the cutter head 200 is closed relative to the machine body 100, the connecting member 541 compresses the elastic component 5422 under the action of the cutter head 200, and the connecting member 541 moves in a direction close to the conduction connection assembly 530 until the connecting member 541 is communicated to the conduction connection assembly 530; and when the cutter head 200 is opened relative to the machine body 100, the connecting member 541 moves in a direction away from the conduction connection assembly 530 under the action of the elastic force of the elastic component 5422, so that the connecting member 541 is disconnected from the conduction connection assembly 530, thereby making the control chip 120 disconnected from the cutter head 200.

Specifically, the elastic component 5422 is a spring, which is sleeved over the connecting component 5411. A limiting step is provided on the second end 5414 of the connecting component 5411, and one end of the spring abuts against the limiting step. The control connection hole 113 is a countersunk hole, that is, the control connection hole 113 includes a first hole segment and a second hole segment that communicate with each other, the radial dimension of the first hole segment is larger than the radial dimension of the second hole segment, the first hole segment is away from the inner cavity of the housing 110 relative to the second hole segment, and the first opening of the control connection hole 113 is the opening at one end of the second hole segment away from the first hole segment. The spring is provided in the first hole segment, and one end of the spring away from the limiting step abuts against the hole bottom of the first hole segment, in this way, when the connecting component 5411 is pressed by the cutter head 200, and moves close to the conduction connection assembly 530 provided in the housing 110, the distance between the limiting step and the hole bottom of the first hole segment decreases, so that the elastic component 5422 is compressed. It can be understood that, in other embodiments, elastic components 5422 of other structures may also be used, such as elastic rubber block.

Optionally, the second conductive sheet 531 is fixed to the housing 110, and the connection position between the second conductive sheet 531 and the housing 110 is located on the lower side of the connecting member 541, or in the axial direction of the control connection hole 113, the connection position between the second conductive sheet 531 and the housing 110 is provided just opposite to the first opening.

In the above arrangement, because in the conduction control assembly 540, when the cutter head 200 is opened relative to the machine body 100, the control member 542 may control the connecting member 541 to be disconnected from the conduction connection assembly 530, so that the control chip 120 is disconnected from the connecting member 541, therefore, when the cutter head 200 is opened relative to the machine body 100, even if the user touches by mistake the part of the connecting member 541 located outside the housing 110 and configured to be communicated to the cutter head 200, the electric shaver 10 will also not automatically start up, thereby further enhancing the use safety of the electric shaver 10.

Figure 14:
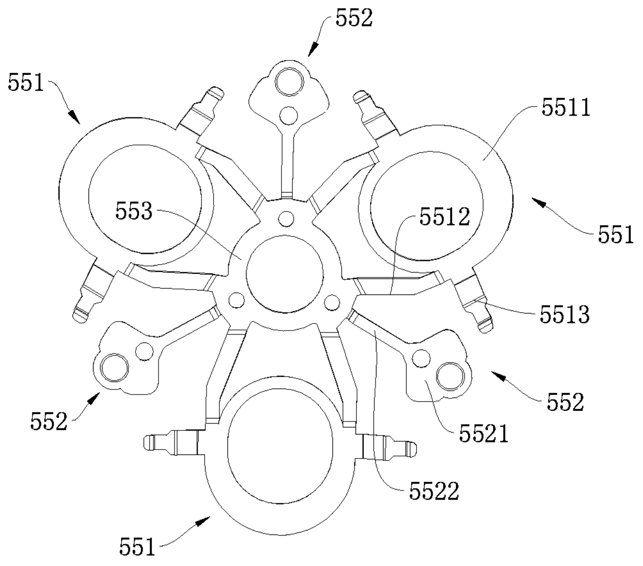
FIG. 14 is a structural schematic view of the cutter net contacting elastic piece in the second electric shaver provided by the embodiment of the present disclosure from a first viewing angle.
Figure 15:
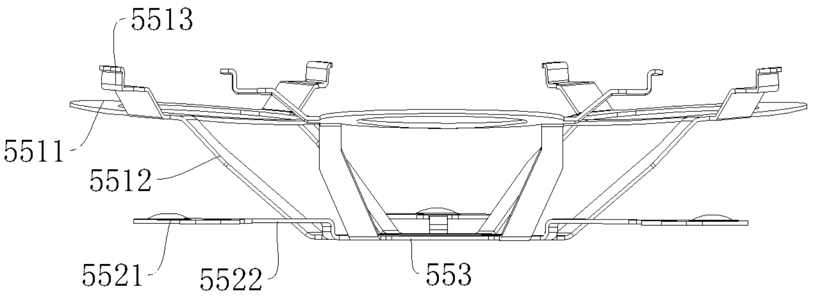
FIG. 15 is a structural schematic view of the cutter net contacting elastic piece in the second electric shaver provided by the embodiment of the present disclosure from a second viewing angle.

FIG. 14 is a structural schematic view of the cutter net contacting elastic piece 550 in the first electric shaver 10 provided by the embodiment of the present disclosure from a first viewing angle, and FIG. 15 is a structural schematic view of the cutter net contacting elastic piece 550 in the first electric shaver 10 provided by the embodiment of the present disclosure from a second viewing angle. Referring to FIG. 10-FIG. 15 in combination, in addition, in order to ensure good contact of the conduction control assembly 540, in the embodiment of the present disclosure, the guide assembly 500 may further include the cutter net contacting elastic piece 550, and the cutter net contacting elastic piece 550 is provided on the cutter head 200 and connected to the head portion induction element 210. When the cutter head 200 is closed relative to the machine body 100, the conduction control assembly 540 is communicated to the head portion induction element 210 through the cutter net contacting elastic piece 550.

Optionally, the cutter net contacting elastic piece 550 includes a first elastic piece part 551 and a second elastic piece part 552 that are connected to each other, the first elastic piece part 551 is connected to the head portion induction element 210, and the second elastic piece part 552 is configured to be communicated to the conduction control assembly 540. Specifically, when the cutter head 200 is closed relative to the machine body 100, the second elastic piece part 552 is in contact with the conduction control assembly 540, so that the second elastic piece part 552 is communicated to the conduction control assembly 540. The number of the first elastic piece part 551 is multiple, and the plurality of first elastic piece parts 551 and the plurality of cutter heads 200 are provided in a one-to-one correspondence. In this way, when the head portion induction element 210 of any one of the plurality of cutter heads 200 senses the proximity of the human body, the second induction signal can be sent to the control chip 120 to control the cutter head 200 to work.

Optionally, the first elastic piece part 551 includes a first contacting part 5511 and a first connecting arm 5512. The first contacting part 5511 is in annular shape, and one end of the cutter head 200 passes through the first contacting part 5511 to cooperate with the transmission shaft assembly 134, the annular first contacting part 5511 increases the contact area between the first elastic sheet part 551 and the cutter net cover 211, thereby ensuring the conduction effect between the first elastic sheet part 551 and the head portion induction element 210 of the cutter head 200. One end of the first connecting arm 5512 is fixedly connected to the first contacting part 5511, and the other end of the first connecting arm 5512 is configured to be connected with the second elastic piece part 552.

Optionally, the first elastic piece part 551 further includes a second connecting arm 5513 connected to the first contacting part 5511, and the second connecting arm 5513 is configured to be snapped with the cutter head 200, so that the first contacting part 5511 is fixed relative to the cutter head 200.

Optionally, the number of the conduction control assembly 540 is multiple, and the plurality of conduction control assemblies 540 are all configured to be communicated to the second conductive sheet 531, so that the fault tolerance rate may be improved, when one of the conduction control assemblies 540 has poor contact, the remaining conduction control assemblies 540 can ensure the conduction between the control chip 120 and the head portion induction element 210. Specifically, the number of the conduction control assembly 540 is two, and the two conduction control assemblies 540 are both configured to be connected to the second conductive sheet 531. The second conductive sheet 531 has two conductive support arms 511, and the two conductive support arms 511 extend to the lower sides of the two conduction control assemblies 540, respectively, so that when the cutter head 200 is closed relative to the machine body 100, the two conduction control assemblies 540 are in contact with the two conductive support arms 511, respectively, so that the two conduction control assemblies 540 are communicated to the second conductive wire 532 at the same time.

Optionally, the number of the second elastic piece part 552 is multiple, and each conduction control assembly 540 corresponds to one second elastic piece part 552, respectively, when the cutter head 200 is closed relative to the machine body 100, each conduction control assembly 540 is communicated to one second elastic piece part 552, respectively, in a manner of connection. Therefore, the number of the second elastic piece part 552 is greater than or equal to the number of the conduction control assembly 540. The plurality of first elastic piece parts 551 and the plurality of second elastic piece parts 552 are alternately arranged in the circumferential direction. Specifically, the number of the second elastic piece part 552 is three, and the three first elastic piece parts 551 and the three second elastic piece parts 552 are alternately provided in the circumferential direction. The cutter net contacting elastic piece 550 further includes a connecting ring part 553, the first elastic piece part 551 and the second elastic piece part 552 are both fixedly connected to the outer circumference of the connecting ring part 553, and the first elastic piece parts 551 and the second elastic piece parts 552 are evenly distributed around the axis of the connecting ring part 553. Specifically, one end of the first connecting arm 5512 of the first elastic piece part 551 away from the first contacting part 5511 is fixedly connected to the connecting ring part 553.

Optionally, one end of the first connecting arm 5512 connected to the connecting ring part 553 extends to one end of the first connecting arm 5512 connected to the first contacting part 5511, and the second connecting arm 5513 extends obliquely upward relative to the connecting ring part 553, so that the formed cutter net contacting elastic piece 550 is in a bowl shape.

Optionally, the second elastic piece part 552 includes a second contacting part 5521 and a third connecting arm 5522, one end of the third connecting arm 5522 is fixedly connected to the connecting ring part 553, and the other end of the third connecting arm 5522 is fixedly connected to the second contacting part 5521, and the second contacting part is configured to be communicated to the guide assembly 500 when the cutter head 200 is closed relative to the machine body 100.

Figure 16:
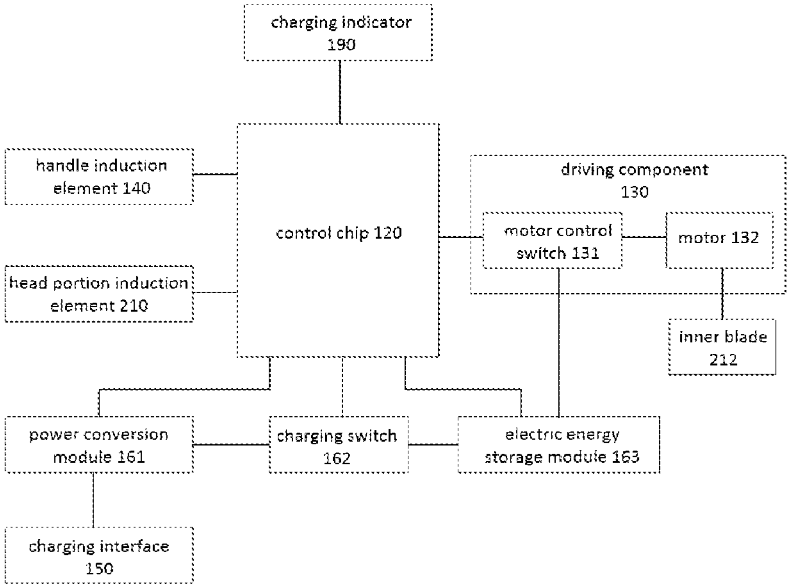
FIG. 16 is a schematic view of a circuit structure of the electric shaver provided by an embodiment of the present disclosure.

FIG. 16 is a schematic view of a circuit structure of the electric shaver 10 provided by the embodiment of the present disclosure, as shown in FIG. 16, the driving component 130 further includes a motor control switch 131, and the motor control switch 131 is connected to the control chip 120 and the motor 132 at the same time, the control chip 120 controls the start and stop of the motor 132 through the motor control switch 131. Optionally, the motor control switch 131 includes any one of the following: thyristor, transistor, field effect transistor, silicon controlled and relay. When the control chip 120 controls the motor 132 to be started through the motor control switch 131, the motor 132 may drive the inner blade 212 to rotate relative to the cutter net cover 211, so as to cut hair and the like.

Optionally, as shown in FIG. 3 and FIG. 16, a charging interface 150 is further provided on the above-mentioned housing 110, and a power conversion module 161, a charging switch 162 and an electric energy storage module 163 are further provided in the housing 110, the power conversion module 161, the charging switch 162 and the electric energy storage module 163 are all connected to the control chip 120, the power conversion module 161 is also connected to the charging interface 150 and the charging switch 162 simultaneously, the charging switch 162 is also connected to the electric energy storage module 163, and the electric energy storage module 163 is also connected to the driving component 130. It should be noted that, in other embodiments, the electrical energy storage module 163 may also be referred to as a power module.

Specifically, the above-mentioned power conversion module 161 may be an AC (alternating current) to DC (direct current) module (AC/DC converter). The electric energy storage module 163 is configured to supply power to the electronic components in the entire electric shaver 10, as shown in FIG. 16, the electric energy storage module 163 is also connected to the motor control switch 131, so as to supply power to the motor 132. The electric energy storage module 163 may be, but is not limited to, a lithium battery. Optionally, the charging switch 162 includes any one of the following: thyristor, transistor, field effect transistor, silicon controlled and relay.

Specifically, the charging control process of the above-mentioned electric shaver 10 shown in FIG. 16 is as follows: sending a charging connection signal to the control chip 120, when the power conversion module 161 is connected to the power supply through the charging interface 150; obtaining the power status of the electric energy storage module 163, when the control chip 120 receives the charging connection signal, and sending the charging control signal to the charging switch 162, when the remaining power of the electric energy storage module 163 is lower than a certain preset value; closing the switch, after the charging switch 162 receives the charging control signal, so that the electrical energy converted by the power conversion module 161 is stored in the electric energy storage module 163 to realize the charging of the electric energy storage module 163. In the above, the above-mentioned preset value can be set according to actual needs, for example, the preset value is set to 99%.

Optionally, as shown in FIG. 3 and FIG. 16, a charging indicator 190 is further provided on the above-mentioned housing 110, the charging indicator 190 is connected to the control chip 120, and the charging indicator 190 is configured to indicate the charging state of the electric energy storage module 163.

In a possible embodiment, as shown in FIG. 3, the charging indicator 190 includes two LED (light emitting diode) lights, the emitting colors of the two LED lights are different, and the two LED lights are respectively configured to indicate two charging states of charging and fully charged. For example, the emitting colors of the two LED lights are respectively set to be red and green, simultaneously, the red LED light is used to indicate the charging state of being in charging, and the green LED light is used to indicate the fully charged charging state.

Figure 17:
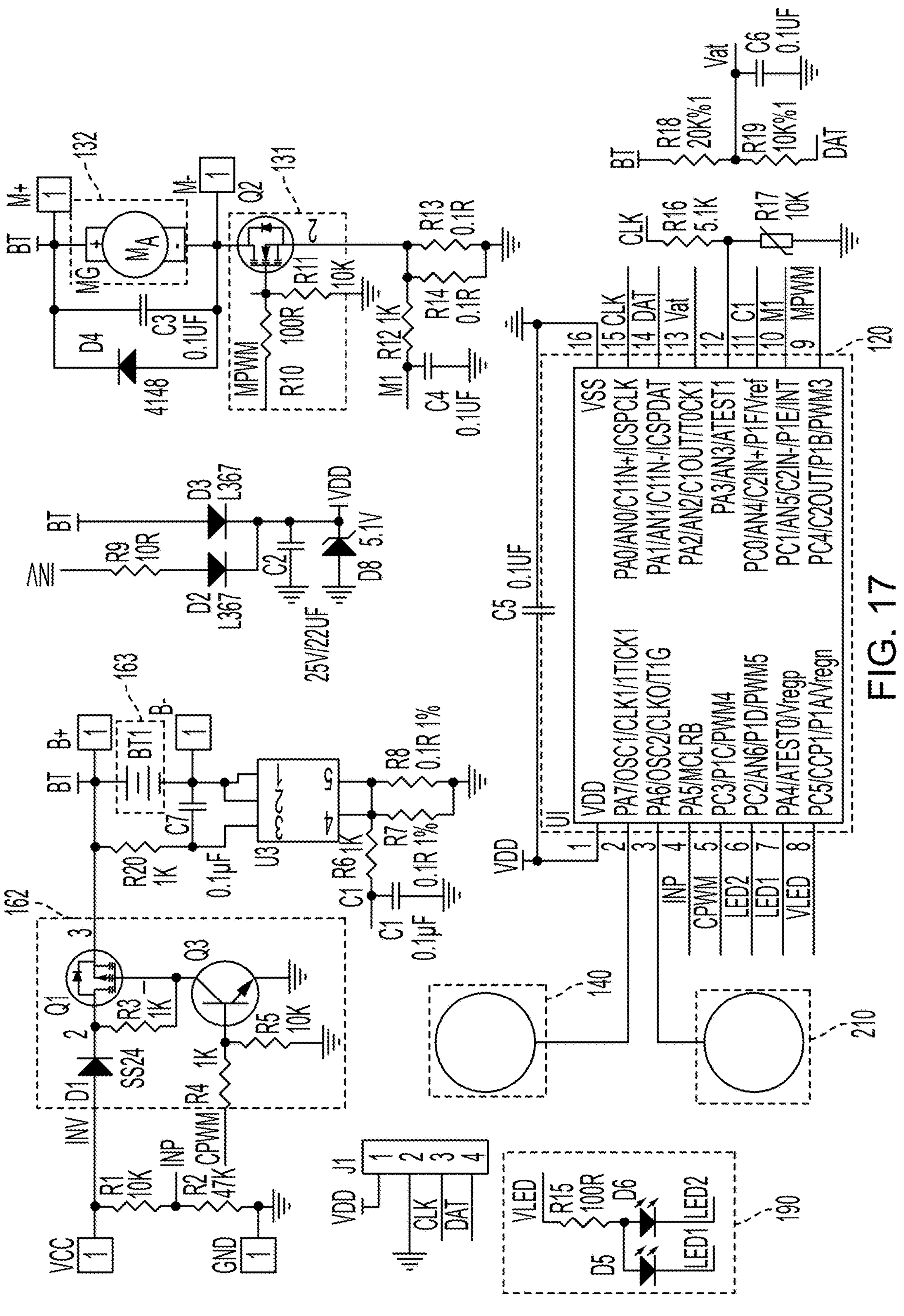
FIG. 17 is a circuit diagram of an electric shaver provided by an embodiment of the present disclosure.

For ease of understanding, the embodiment of the present disclosure also provides a circuit diagram of the electric shaver 10 as shown in FIG. 17, which mainly shows the control chip 120, the handle induction element 140, the head portion induction element 210, the motor control switch 131, the motor 132, the charging switch 162, the electric energy storage module 163 and the charging indicator 190, wherein the motor control switch 131 and the charging switch 162 both include field effect transistors, and the charging indicator 190 includes two LED lights (LED1 and LED2).

It should be noted that the unlabeled parts in FIG. 17 include an overcharge and overdischarge protection circuit of the electric energy storage module 163, a power supply circuit of the control chip 120, a working current detection circuit, a voltage detection circuit and a charging temperature protection circuit and the like.

Furthermore, a corresponding algorithm program can also be burned in the control chip 120 to adjust the induction sensitivity of the electric shaver 10. In this way, it is easier to control the electric shaver 10 to have a suitable sensitivity, and by improving the sensitivity, the effect of automatic starting or stopping of the electric shaver 10 may be optimized. The unlabeled parts in FIG. 17 also include a software algorithm updating module located above the charging indicator 190.

Optionally, a signal compensation circuit (not shown in the figure) may also be provided in the control chip 120, signal compensation is performed on the first induction signal and the second induction signal received by the control chip 120 through the signal compensation circuit, so as to avoid the problem of poor induction sensitivity caused by the difference in the detected capacitance value due to the difference of the human body, when used by different users.

Figure 18:
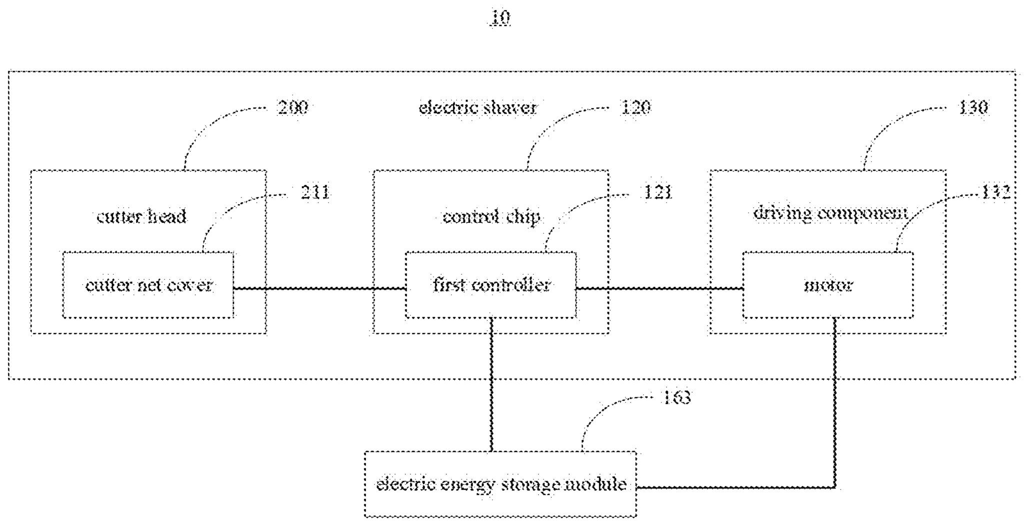
FIG. 18 is a schematic view of another circuit structure of the electric shaver provided by an embodiment of the present disclosure.

FIG. 18 is a schematic view of another circuit structure of the electric shaver 10 provided by the embodiment of the present disclosure, and the circuit structure shows the control circuit structure of the head portion induction element 210. Referring to FIG. 18, as for the control chip 120, in the embodiment of the present disclosure, as an optional embodiment, it may include a first controller 121. Optionally, the first controller 121 may be an integrated circuit chip, which has a signal processing capability, and the first controller 121 may also be a general-purpose processor, for example, a digital signal processor (DSP), an application specific integrated circuit (ASIC), a discrete gate or a transistor logic device, or a discrete hardware assembly, in addition, a general-purpose processor may also be a microprocessor or any other conventional processor.

In the embodiment of the present disclosure, the first controller 121 may be directly communicated to the head portion induction element 210 to detect the electrical signal carried on the head portion induction element 210, that is, the capacitance, and when an increase in the capacitance is detected, the driving component 130 is controlled to be started, thereby driving the cutter head 200 to work; and when the detected capacitance decreases, the driving component 130 is controlled to be turned off, so that the cutter head 200 stops working, wherein controlling the driving component 130 to be started may be controlling the driving component 130 to be connected to the electric energy storage module 163, and controlling the driving component 130 to be turned off may be controlling the driving component 130 to be disconnected from the electric energy storage module 163, that is, by controlling the power on and off of the driving component 130, the starting and stopping of the driving component 130 may be controlled.

Figure 19:
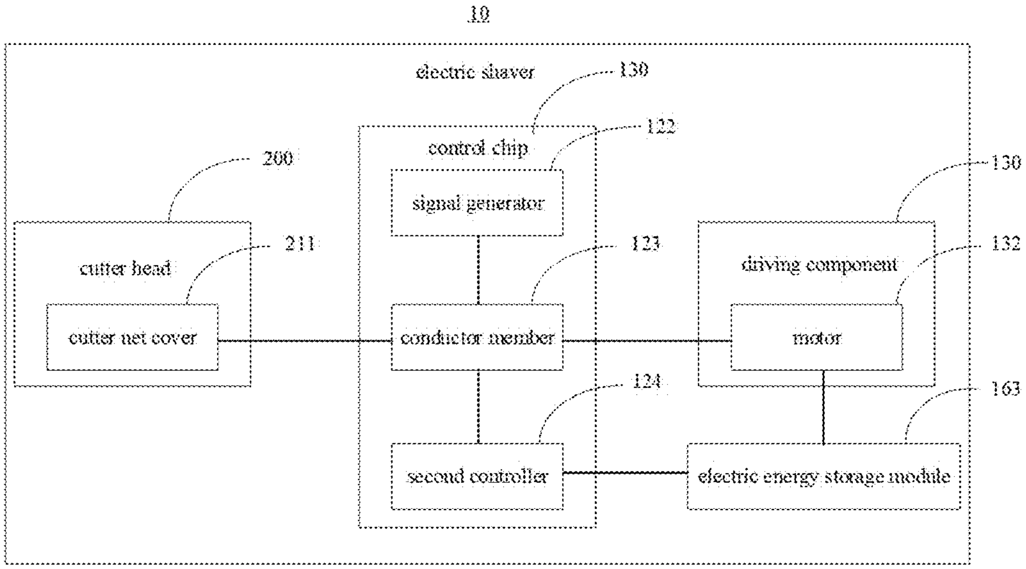
FIG. 19 is a schematic view of yet another circuit structure of the electric shaver provided by an embodiment of the present disclosure.

FIG. 19 is a schematic view of yet another circuit structure of the electric shaver 10 provided by the embodiment of the present disclosure, and the circuit structure shows the control circuit structure of the head portion induction element 210. Referring to FIG. 15, as for the control chip 120, in the embodiment of the present disclosure, as another optional embodiment, it may also include a signal generator 122, a conductor member 123 and a second controller 124 that are connected in sequence. In the above, the conductor member 123 is also communicated to the head portion induction element 210, and the second controller 124 is also connected to the driving component 130. Optionally, the second controller 124 may be an integrated circuit chip, which has signal processing capability; and the second controller 124 may also be a general-purpose processor, for example, a digital signal processor (DSP), an application specific integrated circuit (ASIC), a discrete gate or a transistor logic device, or a discrete hardware assembly, in addition, a general-purpose processor may also be a microprocessor or any other conventional processor.

In an embodiment of the present disclosure, the signal generator 122 is configured to generate an initial alternating-current signal and transmit the initial alternating-current signal to the conductor member 123. The second controller 124 is configured to collect the target alternating-current signal output by the conductor member 123 after the initial alternating-current signal is transmitted to the conductor member 123, and determine whether the electrical signal carried on the cutter net cover 211 changes according to induction result generated by the target alternating-current signal, thereby controlling the driving component 130 to start and stop. When the driving component 130 is started, the driving component 130 drives the cutter head 200 to work; and when the driving component 130 is turned off, the cutter head 200 stops working accordingly. In the above, controlling the driving component 130 to be started may be controlling the driving component 130 to be connected to the electric power storage module 163, and controlling the driving component 130 to be turned off may be controlling the driving component 130 to be disconnected from the electric power storage module 163, that is, by controlling the power on and off of the driving component 130, the starting and stopping of the driving component 130 may be controlled.

Furthermore, the working principle of the control chip 120 shown in FIG. 19 is that when the human body is far away from the cutter net cover 211 (that is, the head portion induction element 210), the intensity of target alternating-current signal output by the conductor member 123 is equivalent to the intensity of the initial alternating-current signal; and when the human body is close to the cutter net cover 211, the human body carries a certain capacitance, which may have a bypass effect on the initial alternating-current signal transmitted on the conductor member 123, so that the conductor member 123 outputs the target alternating-current signal that is weaker than the initial alternating-current signal, the second controller 124 can generate an induction result according to the intensity of the target alternating-current signal, so as to determine whether the electrical signal carried on the cutter net cover 211 changes, thereby controlling the driving component 130 to start and stop. When the driving component 130 is started, the driving component 130 drives the cutter head 200 to work; and when the driving component 130 is turned off, the cutter head 200 stops working accordingly.

Specifically, the process that the second controller 124 generates the induction result according to the intensity of the target alternating-current signal to determine whether the electrical signal carried on the cutter net cover 211 changes may be that when the intensity of the target alternating-current signal is less than a preset intensity threshold, it indicates that the electrical signal carried on the cutter net cover 211 increases, then the first induction result of controlling the driving component 130 to be started is generated; and when the intensity of the target alternating-current signal is greater than or equal to the preset intensity threshold, it indicates that the electrical signal carried on the cutter net cover 211 has not changed or decreased, then the second induction result representing that the electrical signal carried on the cutter net cover 211 has not changed or decreased is generated, the second induction result controls the driving component 130 to be turned off, and makes the cutter head 200 stop working.

To sum up, the electric shaver 10 provided by the embodiments of the present disclosure includes a machine body 100 and a cutter head 200. The machine body 100 includes a housing 110, a control chip 120, a driving component 130 and a handle induction element 140. The cutter head 200 is provided on the housing through the cutter head support 220, the control chip 120 and the driving component 130 are both provided inside the housing 110, and the control chip 120 is connected to the driving component 130. The cutter head 200 includes a cutter net cover 211 and an inner blade 212 provided inside the cutter net cover 211, and the cutter net cover 211 of the cutter head 200 is used as the head portion induction element 210 to be communicated to the control chip 120. The control chip 120 is configured to control the driving component 130 to start and stop when detecting that the electrical signal carried on the cutter net cover 211 changes. When the driving component 130 is started, the driving component 130 drives the cutter head 200 to work; and when the driving component 130 is turned off, the cutter head 200 stops working.

In this way, when the human body is close to or away from the cutter net cover 211, since the human body itself carries a certain capacitance, the electrical signal detected by the control chip 120 will be changed, and according to the change, the driving component 130 is controlled to be started to drive the cutter head 200 to work, or the driving component 130 is controlled to be turned off, so that the cutter head 200 stops working. For example, when the human body is close to the cutter net cover 211, the capacitance detected by the control chip 120 increases, and the driving component 130 is controlled to be started to drive the cutter head 200 to work; and when the human body is away from the cutter net cover 211, the capacitance detected by the control chip 120 decreases, and the driving component 130 is controlled to be turned off, so that the cutter head 200 stops working, thereby achieving the purpose of the present disclosure that when the user brings the cutter net cover 211 of the electric shaver 10 close to the target area, the electric shaver 10 may be automatically activated, and when the user moves the cutter net cover 211 of the electric shaver 10 away from the target area, the electric shaver 10 may be automatically turned off, which greatly enhances the convenience of using the electric shaver 10.

It should be noted that the specific position of the target area is determined according to the specific use, for example, the target area can be any area that requires shaving or hair removal, such as the face, head, and legs of the human body.

Figure 20:
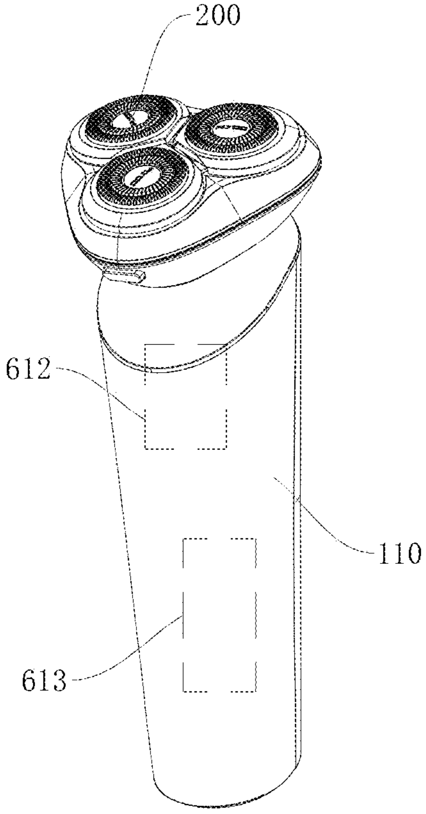
FIG. 20 is a structural schematic view of a handheld household electrical appliance provided by an embodiment of the present disclosure.

FIG. 20 is a structural schematic view of a handheld household electrical appliance provided by the embodiment of the present disclosure. Referring to FIG. 1 to FIG. 20 in combination, in a certain embodiment, the handheld household electrical appliance includes:

a induction assembly, wherein the induction assembly is configured to detect whether the handheld household electrical appliance is in a state of being held by an operator; and the induction assembly is further configured to detect the distance between the handheld household electrical appliance and the application object; and a controller (also referred to as a control chip in other embodiments), wherein the controller is configured to control the operating state of the handheld household electrical appliance according to the handheld state and distance detected by the induction assembly, and the induction assembly is electrically connected to the controller.

In this embodiment, the induction assembly is configured to detect whether the handheld household electrical appliance is in the state of being held by the operator, for example, the handheld household electrical appliance shown in FIG. 20 is a beard clipper, and then the handheld household electrical appliance can also be regarded as an electric shaver 10, it can be understood that the handheld household electrical appliance can also be other household electrical appliances that are operated by hand holding. The induction assembly can be regarded as a general term for the head portion induction element 210 and the handle induction element 140. Meanwhile, the handheld state detected by the induction assembly is the above-mentioned first induction signal generated when held by the operator, the distance between the electric shaver 10 and the application object detected by the induction assembly is the above-mentioned second induction signal when the skin approaches.

It should be noted that "the second induction signal when the skin approaches" herein should not be understood as a restriction on the second induction signal, in this embodiment, since the cutter net cover 211 is used as the component in the induction assembly that detects the distance between the electric shaver 10 and the application object, therefore, only the skin or the like having a certain capacitance can make the controller learn the change of the distance between the electric shaver 10 and the application object through the change of the electrical signal, it can be understood that in other embodiments, for example, when an infrared sensor is used to detect the distance between the electric shaver 10 and the application object, and when the object to be cut without capacitance approaches, the induction assembly can also learn the distance between the electric shaver 10 and the application object.

Compared with traditional handheld household electrical appliances, in which the start switch needs to be pressed or pushed and pulled in use, in this solution, the induction assembly is used to detect the state of the handheld household electrical appliance, and when the detection result satisfies the preset conditions in the controller, the controller controls the operation of the handheld household electrical appliance to achieve the purpose of use.

Specifically, the handheld household electrical appliance further includes a PCB board (printed circuit board), and the induction assembly and the controller are respectively connected to the PCB board, during use, the induction assembly transmits a signal to the PCB board, the signal is introduced into the controller through the circuit of the PCB board.

In an optional embodiment, the handheld household electrical appliance further includes functional component, and the functional component includes:

an action member, wherein the action member is configured to realize a predetermined function of the handheld household electrical appliance; and a support member, configured as an assembly of the action member, the induction assembly and the controller, wherein the support member comprises an action end configured to be assembled with the action member and a handheld end configured to be held by an operator.

The action member is configured to realize the preset function of the present handheld household electrical appliance, and its structure depends on the type of the handheld household electrical appliance. For example, in the handheld household electrical appliance shown in FIG. 20, the handheld household electrical appliance is a beard clipper, and the action member is a component that realizes the preset function of the beard clipper, that is, the action member is the cutter head 200 of the electric shaver 10.

The support member is configured to assemble the action member, the induction assembly and the controller, it can be understood that the support member can be regarded as the general term of the above-mentioned housing 110 and the above-mentioned cutter head support 220 in the first electric shaver 10 provided by the embodiment of the present disclosure. The action end in the support member configured to be assembled with the action member can be regarded as the above-mentioned cutter head support 220, and the handheld end in the support member configured to be held by the operator can be regarded as the above-mentioned housing 110.

In an optional embodiment, the induction assembly and the controller are electrically connected through a shielded wire, and the shielded wire is configured to shield the electromagnetic field generated during the operation of the action member, so as to avoid false induction.

In an optional embodiment, the induction assembly includes:

- a first sensor (that is, the head portion induction element 210), the first sensor is located at the action end (that is, the cutter head support 220), and configured to detect the distance between the electric shaver 10 and the application object; and
- a second sensor (that is, the handle induction element 140), the second sensor is located at the handheld end (that is, the housing 110), and configured to detect whether the electric shaver 10 is in the state of being held by the operator.

The first sensor is located at the action end, since the first sensor is close to the action member, the distance between the action member and the application object can be accurately detected by the first sensor. The second sensor is located at the handheld end, and can detect whether the handheld household electrical appliance is in the state of being held by the operator. Simultaneously, since the second sensor is only provided on the handheld end, the handheld position of operator can be limited to determine whether the equipment is held by the operator with correct gestures at this time, so as to avoid the operation of the equipment caused by the operator's misoperation or the personal injury caused by the operator's wrong operation.

Referring to FIG. 20, the driving component 130 of the handheld household electrical appliance provided by the embodiment of the present disclosure includes an ultrasonic amplitude coil 612 and a high-frequency acoustic-wave oscillation circuit 613, the ultrasonic amplitude coil 612 and the high-frequency acoustic-wave oscillation circuit 613 are located in the housing 110. The cutter head 200 is in transmission connection with the ultrasonic amplitude coil 612, and the cutter head 200 is driven to work by the high-frequency acoustic-wave amplitude generated by the ultrasonic amplitude coil 612. On the electric shaver 10, the second sensor is located at the handheld end, so as to detect the user's holding; and the second sensor and the first sensor are both electrically connected to the high-frequency acoustic-wave oscillation circuit 613, and the high-frequency acoustic-wave oscillation circuit 613 controls the operation of the ultrasonic amplitude coil 612 according to the detection results of the second sensor and the first sensor. When using beard clipper products currently on the market, it is necessary to use a traditional brushless or brushed motor (that is, motor) to drive the cutter head 200 to work to achieve the shaving effect. Compared with the existing beard clipper products, the present disclosure uses the ultrasonic amplitude coil 612 to realize the driving of the cutter head 200 and achieve the effect of shaving, the work efficiency is improved, and the shaver has low noise in use, low load consumption, small current, and the long usable time.

It should be noted that the first electric shaver 10 and the second electric shaver 10 provided by the embodiment of the present disclosure are beard clippers, that is, the first electric shaver 10 and the second electric shaver 10 are used for trimming beards, it can be understood that, in other embodiments, the electric shaver 10 can also be provided with specific structures according to the application. As an example, FIG. 21 shows the structure of a third electric shaver 10 provided by the embodiment of the present disclosure, and the third electric shaver 10 is a hair clipper, that is, the third electric shaver 10 is used for trimming hair; and as an example, FIG. 22 shows the structure of the fourth electric shaver 10 provided by the embodiment of the present disclosure, and the fourth electric shaver 10 is a hairball trimmer, that is, the fourth electric shaver 10 is used for trimming hair balls that appear in sweaters and the like.

Figure 21:
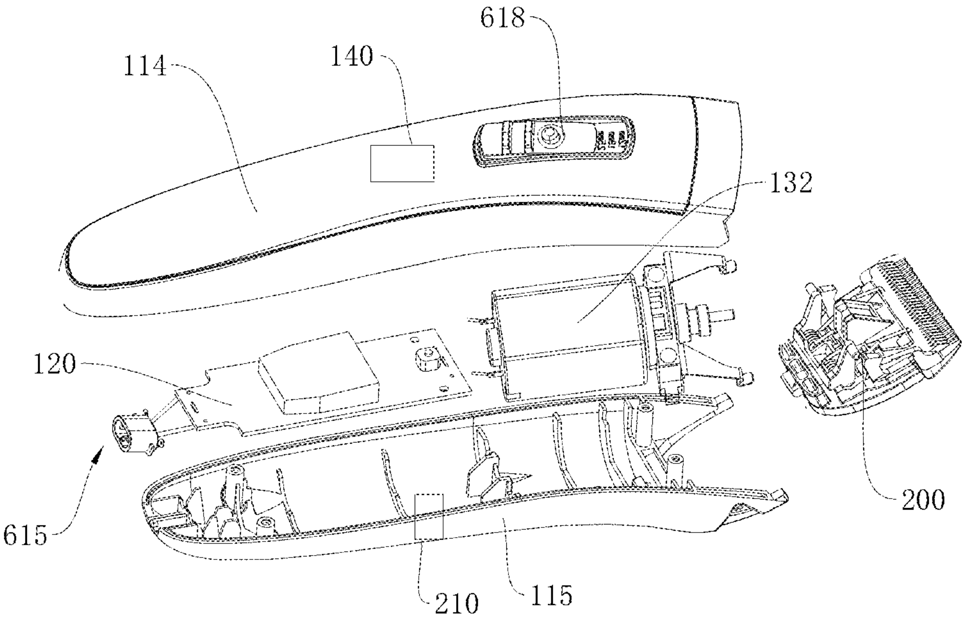
FIG. 21 is a structural schematic view of a third electric shaver provided by an embodiment of the present disclosure.

Referring to FIG. 21, the third electric shaver 10 provided by the embodiment of the present disclosure is a hair clipper, and action member thereof is a cutter head 200, and the cutter head 200 includes a cutter holder, a blade and a reversing device. The motor 132 in the driving component 130 of the hair clipper is a rotor motor, and the rotation movement mode of the motor 132 can be converted into the movement mode of the blade going back and forth in the cutter holder through the reversing device. A movable cutter adjuster 618 is provided on the machine body, and the movable cutter adjuster 618 is configured to change the rotational speed of the motor 132 to realize multi-speed adjustment for the blade movement frequency.

Optionally, the support member includes a front housing 114 and a rear housing 115 that are connected to each other. The second sensor is embedded in the front housing 114, and the second sensor is configured to detect whether it is in a state of being held by the operator. The first sensor is embedded in the rear housing 115, and the first sensor is provided near the cutter head 200, so as to detect the distance between the cutter head 200 and the operator's face. The first sensor, the second sensor and the control chip 120 and the like are electrically connected to form an induction module circuit 615, the induction module circuit 615 is electrically connected to the movable cutter adjuster 618 and the motor 132 at the same time, so as to realize the automatic operation of the motor 132 and the manual adjustment of the rotational speed.

Figure 22:
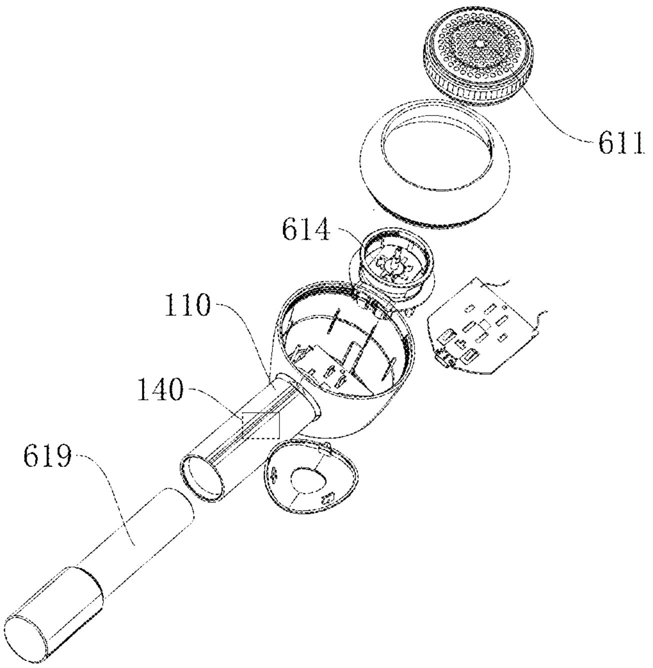
FIG. 22 is a structural schematic view of a fourth electric shaver provided by an embodiment of the present disclosure.

Referring to FIG. 22, the fourth electric shaver 10 provided by the embodiment of the present disclosure is a hairball trimmer, and the action member of the hairball trimmer is a cutter net assembly 611. A motor 132 and a transmission assembly 614 are provided in the support member, and the transmission assembly 614 is in transmission connection with the cutter net assembly 611 to drive the cutter net assembly 611 to rotate. Through the rotation of the blade in the cutter net assembly 611, a relative movement is generated between the blade and the external grille, thereby producing a shearing effect, so as to realize the trimming of the hair balls.

A second sensor is provided on the support member to detect whether it is in a state of being held by the operator. A hairball sticker 619 configured to collect hair balls is also provided in the support member near the second sensor, a hair storage cavity is formed between the transmission assembly 614 and the inner end of the cutter net assembly 611, and the hairball sticker 619 extends into the hair storage cavity, and the trimmed hair balls pass through the cutter net assembly 611 and enter the hair storage cavity from the inner end of the cutter net assembly 611. The hair balls entering the hair storage cavity fall into the portion closed to the transmission assembly 614. After the hairball sticker 619 extends into the hair storage cavity, the end of the hairball sticker 619 is close to the transmission assembly 614, therefore, when the hairball trimmer shakes during use, the hairballs contact with the hairball sticker 619 and adhere to the hairball sticker 619 to complete the collection of hair balls. The hairball sticker 619 is detachably connected to the support member, after the collection of hair balls is completed, the hairball sticker 619 can be detached from the support member, so as to remove the hair balls on the hairball sticker 619.

In an embodiment of the present disclosure, the electric shaver 10 can be regarded as including: a machine body (that is, the above-mentioned housing 110), a head cover assembly (that is, the above-mentioned cutter head 200), a start-stop controller (that is, the above-mentioned control chip 120) and the drive assembly (that is, the above-mentioned driving component 130). The head cover assembly includes a cutter net cover (that is, the above-mentioned cutter net cover 211) and a cutter head (that is, the above-mentioned inner blade 212) provided inside the cutter net cover, the cutter net cover is provided on the machine body, the start-stop controller and the drive assembly is provided inside the machine body. It should be noted that, for the convenience of distinguishing from the cutter head 200, the first cutter head is hereinafter referred to as the cutter head of the head cover assembly. The start-stop controller is connected to the drive assembly, and can be communicated to the cutter net cover, so as to be configured to control the drive assembly to be started to drive the first cutter head to work, or control the drive assembly to be turned off to make the first cutter head stop working, when a change in the electrical signal carried on the cutter net cover is detected.

Through the above-mentioned configuration, when the human body is close to or away from the cutter net cover, since the human body itself carries a certain capacitance, the electrical signal detected by the start-stop controller will be changed, and according to the change, the drive assembly is controlled to be started to drive the first cutter head to work, or the drive assembly is controlled to be turned off, so that the first cutter head stops working. In the above, the change of the electrical signal mainly refers to the change of the capacitance, for example, when the human body is close to the cutter net cover, the capacitance detected by the start-stop controller increases, and the start-stop controller controls the drive assembly to be started to drive the first cutter head to work; and when the human body is far away from the cutter net cover, the capacitance detected by the start-stop controller decreases, and the start-stop controller controls the drive assembly to be turned off, so that the first cutter head stops working, thereby achieving the purpose of the present disclosure that when the user puts the cutter net cover of the electric shaver 10 close to the target area, the electric shaver can be automatically activated, and when the user moves the cutter net cover of the electric shaver 10 away from the target area, the electric shaver 10 can be automatically turned off, thereby enhancing greatly the convenience of using the electric shaver 10. In the above, the target area may be any area of hair, such as beard, that needs to be shaved, such as the face, head, and legs of the human body.

The embodiment of the present disclosure also provides an electric shaver system (not shown in the figure), which includes the above-mentioned electric shaver 10, and also includes a charging head (not shown in the figure). The charging head is connected to the electric shaver 10, and the charging head is configured to charge the electric shaver 10. Alternatively, the electric shaver system may also include a charging head and the above-mentioned handheld household electrical appliance. The charging head is connected to the handheld household electrical appliance, and the charging head is configured to charge the handheld household electrical appliance.

Specifically, the input end of the charging head is connected to the power supply, and the output end of the charging head is connected to the charging interface 150 of the electric shaver 10 or the handheld household electrical appliance, so that the electric shaver 10 (or the handheld household electrical appliance) is connected to the power supply through the charging head, so as to realize the charging of the electric shaver 10 (or the handheld household electrical appliance).

Figure 23:
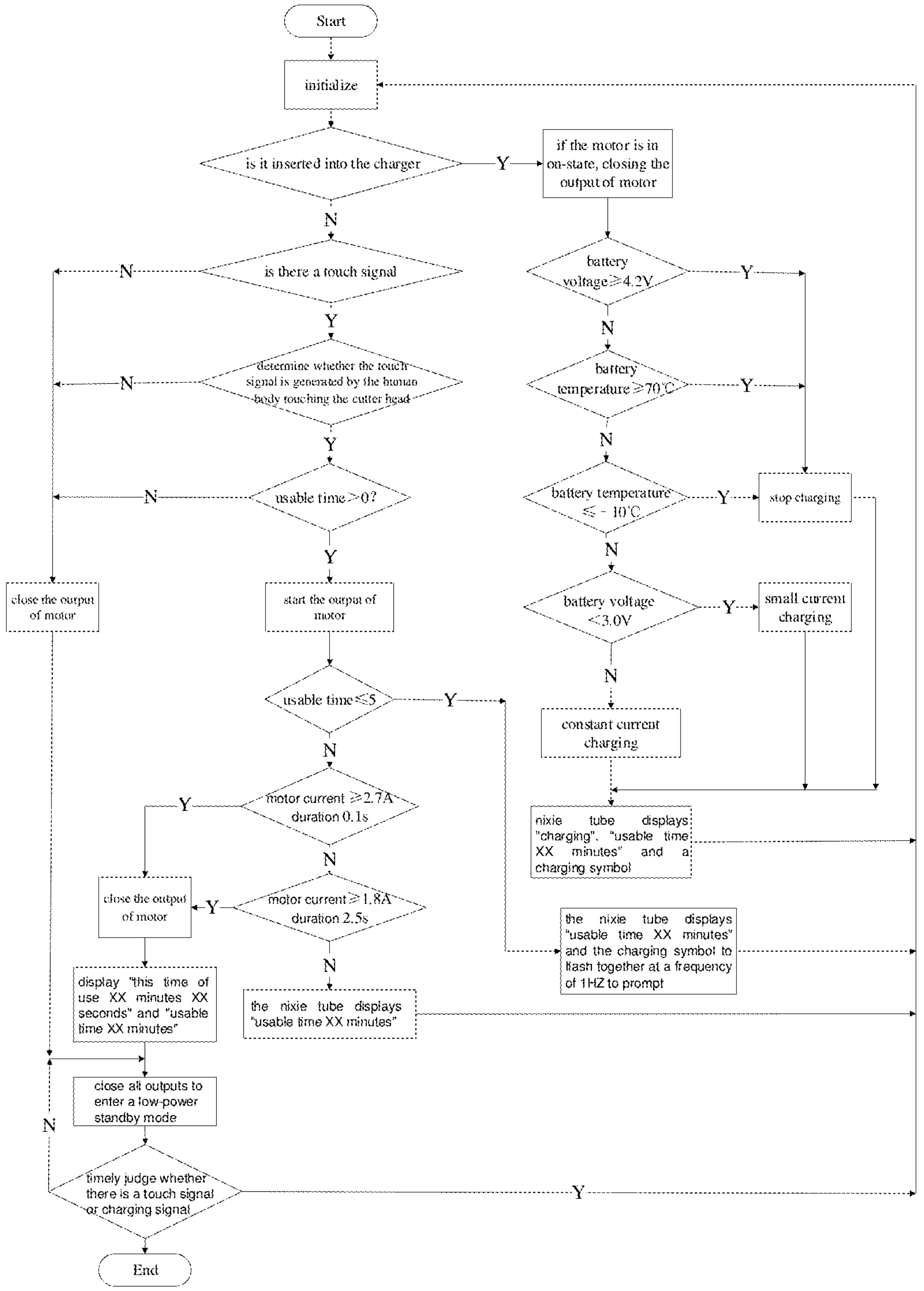
FIG. 23 is a control flow chart of the electric shaver provided by an embodiment of the present disclosure.

FIG. 23 is a control flow chart of the electric shaver 10 provided by the embodiment of the present disclosure. Referring to FIG. 23, the embodiment of the present disclosure further provides a control method, and the control chip 120 (also referred to as a controller or a start-stop controller) of the electric shaver 10 described above executes the control method. Specifically, the control method includes following steps.

S01, acquiring a touch signal.

The head portion induction element 210 generates the touch signal, and sends the touch signal to the control chip 120 to acquire the touch signal.

Before acquiring the touch signal, acquiring the charging state of the electric shaver 10 is further included. When the electric shaver 10 is in the charging state, the step of acquiring the touch signal is performed, and when the electric shaver 10 is not in the charging state, the following steps are performed.

- a1, acquiring the charging state of the electric shaver 10, when the electric shaver 10 is not in the charging state, performing the step of acquiring the touch signal; and when the electric shaver 10 is in the charging state, acquiring the state of the driving component 130, if the driving component 130 is in the on-state, controlling the driving component 130 to be turned off.

The charging state of the electric shaver 10 is obtained by detecting whether the electric shaver 10 is inserted into the charger, when detecting that the electric shaver 10 is inserted into the charger, the electric shaver 10 is in the charging state, when the electric shaver 10 is not inserted into the charger, the electric shaver is not in the charging state.

- a2, when the electric shaver is in the charging state, acquiring the state of the driving component, if the driving component is in the on-state, controlling the driving component to be turned off, then acquiring the voltage value of the electric energy storage module 163 (that is, the battery) of the electric shaver 10, when the voltage value is greater than or equal to 4.2 v, controlling the electric shaver 10 to stop being charged, and when the voltage value is less than 4.2 v, acquiring the temperature value of the electric energy storage module 163.
- a3, determining whether the temperature value of the electric energy storage module 163 is greater than or equal to 70° C., if the temperature value is greater than or equal to 70° C., controlling the electric shaver 10 to stop being charged, and if the temperature value is less than 70° C., continuing to determine whether the temperature value of the electric energy storage module 163 is less than or equal to −10° C., if the temperature value is less than or equal to −10° C., controlling the electric shaver 10 to stop being charged, and if the temperature value is greater than −10° C., acquiring the voltage value of the electric energy storage module 163. In other words, when the temperature value is greater than or equal to 70° C. or less than or equal to −10° C., the electric shaver 10 is controlled to stop being charged, and when the temperature value is greater than −10° C. and less than 70° C., the voltage value of the electric energy storage module 163 is acquired.

a4, determining whether the voltage value of the electric energy storage module 163 is less than 3.0 v, if the voltage value is less than 3.0 v, controlling the electric shaver 10 to be charged with a small current, and if the voltage value is greater than or equal to 3.0 v, controlling the electric shaver 10 to be charged with a constant current.

Optionally, after controlling the electric shaver 10 to stop being charged, be charged with a small current or be charged with a constant current, the nixie tube (not shown in the figure) of the electric shaver 10 is controlled to display the usable time, simultaneously, and when the electric shaver 10 is in a charging state, the nixie tube also displays "charging" and a charging symbol.

S02, determining whether the touch signal is generated by the human body touching the cutter head 200 of the electric shaver 10, and when the touch signal is not generated by the human body contacting the cutter head 200, controlling the driving component to be turned, so as to prevent the electric shaver 10 from starting by mistake; and when the touch signal is generated by the human body contacting the cutter head 200, acquiring the usable duration of the electric shaver 10, and determining whether the usable duration is greater than 0, when the usable duration is greater than 0, controlling the driving component 130 of the electric shaver 10 to be started, and when the usable duration is less than 0, controlling the driving component 130 to be turned off.

In this embodiment, the driving component 130 includes a motor 132, controlling the driving component 130 to be started means controlling the output of the motor 132 to be started, controlling the driving component 130 to be turned off means controlling the output of the motor 132 to be stopped.

Optionally, after the output of motor is started, the control chip 120 acquires the usable duration of the electric shaver 10 periodically or in real time, the usable duration is learned by the remaining power of the electric energy storage module 163, when the remaining power representing the usable duration is less than or equal to 5%, the nixie tube of the electric shaver 10 is controlled to display the usable time, which flickers at a frequency of 1 HZ together with the charging symbol at the nixie tube, so as to prompt charging. When the remaining power representing the usable duration is greater than 5%, the control chip 120 performs current detection to avoid damage to the motor due to excessive motor current.

Specifically, the current detection includes the following steps.

b1, acquiring the motor current and the duration, when the motor current is greater than or equal to 2.7 A and the duration reaches 0.1 s, controlling the output of the motor 132 to be closed, when the motor current is less than 2.7 A, or the motor current is greater than or equal to 2.7 A but the duration does not reach 0.1 s, performing the next step.

b2, when the motor current is greater than or equal to 1.8 A and the duration reaches 2.5 s, controlling the output of the motor 132 to be closed, and when the motor current is less than 1.8 A, or the motor current is greater than or equal to 1.8 A but the duration does not reach 2.5 s, indicating that the use of the motor 132 is safe, at this time, the control chip 120 controls the nixie tube to display the usable time.

Optionally, after the output of the motor 132 is closed, the nixie tube is controlled to display the current use duration and the usable duration. Optionally, after the output of the motor 132 is closed, the electric shaver 10 is controlled to close all outputs to enter a low-power standby mode.

In all examples shown and described herein, any specific value should be construed as merely an example and not a limitation, therefore, other examples of exemplary embodiments may have different values.

It should be noted that similar reference numerals and letters indicate similar items in the following accompanying drawings, therefore, once a certain item is defined in one drawing, it does not need to be further defined and explained in subsequent drawings.

Furthermore, in the description of the embodiments of the present disclosure, unless otherwise definitely specified and limited, the terms "mount", "link" and "connect" should be understood in a broad sense, for example, they can be fixed connection, detachable connection or integrated connection; they can be mechanical connection or electrical connection; they can be directly attached or indirectly attached by intermediate medium, and the connection can be the internal communication between two components. For those ordinarily skilled in the art, the specific meaning of the above terms in the present disclosure can be understood according to the specific situation.

In the description of the present disclosure, it should be noted that orientation or positional relations indicated by terms, such as "center", "upper", "lower", "left", "right", "vertical", "horizontal", "inner", and "outer" are based on orientation or positional relations as shown in the accompanying drawings, merely for facilitating the description of the present disclosure and simplifying the description, rather than indicating or implying that related devices or elements have to be in the specific orientation, or configured and operated in a specific orientation, therefore, they should not be construed as limitations on the present disclosure. Besides, terms "first", "second" and "third" are merely for descriptive purpose, but should not be construed as indicating or implying relative importance.

Finally, it should be noted that the above embodiments are only used to illustrate the technical solution of the present disclosure, not to limit it; although the present disclosure has been described in detail with reference to the above-mentioned embodiments, those ordinarily skilled in the art should understand that they can still modify the technical solution recorded in the above-mentioned embodiments, or equivalently replace some or all of the technical features; and these modifications or substitutions do not make the essence of the corresponding technical solutions out of the scope of the technical solutions of the embodiments of the present disclosure.

INDUSTRIAL APPLICABILITY

To sum up, the present disclosure provides an electric shaver, a handheld household electrical appliance, an electric shaver system and a control method, so that the electric shaver can be started without an operation that a user presses a switch when in use, which is convenient to use and improves the experience feeling of user.

What is claimed is:

1. An electric shaver, wherein the electric shaver comprises a machine body and a cutter head that are connected to each other, wherein the machine body comprises a housing, a control chip and a driving component, wherein the control chip and the driving component are provided within the housing, and a head portion induction element is provided on the cutter head; the cutter head is in transmission connection with the driving component, and both the head portion induction element and the driving component are connected to the control chip; and the control chip is configured to control the driving component to be started when receiving a signal from the head portion induction element;

the cutter head can be closed or opened relative to the machine body, wherein when the cutter head is closed relative to the machine body, the driving component is in transmission connection with the cutter head, and when the cutter head is opened relative to the machine body, the driving component is separated from the cutter head; and the electric shaver further comprises a guide assembly, the guide assembly is connected to the control chip, when the cutter head is closed relative to the machine body, the guide assembly is communicated to the head portion induction element, so that the control chip is communicated to the head portion induction element; and when the cutter head is opened relative to the machine body, the guide assembly is disconnected from the head portion induction element, so that the control chip is disconnected from the head portion induction element;

wherein the guide assembly comprises a first conductive sheet and a first conductive wire, wherein the first conductive sheet is connected to the transmission shaft assembly, and two ends of the first conductive wire are respectively connected to the control chip and the first conductive sheet;

wherein the first conductive wire is a shielded wire.

2. The electric shaver according to claim 1, wherein the cutter head further comprises a cutter net cover and an inner blade provided inside the cutter net cover; and the head portion induction element comprises the cutter net cover, and the control chip can be communicated to the cutter net cover, so as to be configured to control the driving component to be started to drive the inner blade to work, or control the driving component to be turned off to make the inner blade stop working, when detecting that an electrical signal carried by the cutter net cover changes.

3. The electric shaver according to claim 1, wherein the driving component comprises a motor and a transmission shaft assembly being in transmission connection with the motor, wherein the motor is provided in an inner cavity of the housing and connected to the control chip; a drive connection hole communicating with the inner cavity of the housing is provided on an end surface of one end of the housing; and the transmission shaft assembly is provided on the end surface, and the transmission shaft assembly passes through the drive connection hole to be in transmission connection with the motor, when the cutter head is closed relative to the machine body, the transmission shaft assembly is in transmission connection with the cutter head, and when the cutter head is opened relative to the machine body, the transmission shaft assembly is separated from the cutter head; and the guide assembly is connected to the control chip and the transmission shaft assembly at the same time, when the transmission shaft assembly is in transmission connection with the cutter head, the control chip is communicated to the head portion induction element through the guide assembly, the transmission shaft assembly and the cutter head sequentially; and when the transmission shaft assembly is separated from the cutter head, the transmission shaft assembly is disconnected from the cutter head, so that the control chip is disconnected from the head portion induction element.

4. The electric shaver according to claim 1, wherein the guide assembly comprises a conduction connection assembly and a conduction control assembly, wherein the conduction connection assembly is provided inside the housing and connected to the control chip; and the conduction control assembly is provided on the machine body, and when the cutter head is closed relative to the machine body, the conduction control assembly is communicated to the head portion induction element and the conduction connection assembly at the same time, so that the control chip is communicated to the head portion induction element through the conduction connection assembly and the conduction control assembly sequentially, and when the cutter head is opened relative to the machine body, the conduction control assembly is disconnected from the head portion induction element, so that the control chip is disconnected from the head portion induction element.

5. The electric shaver according to claim 4, wherein the conduction connection assembly comprises a second conductive sheet and a second conductive wire, the second conductive sheet is connected to one end of the conduction control assembly away from the cutter head, and the second conductive wire is connected to the control chip and the second conductive sheet at the same time.

6. The electric shaver according to claim 5, wherein the second conductive wire is a shielded wire.

7. The electric shaver according to claim 4, wherein a control connection hole communicating with an inner cavity of the housing is provided on the housing; and the conduction control assembly comprises a connecting member and a control member, wherein the connecting member passes through the control connection hole; a first end of the connecting member is located in the housing and configured to be communicated to the conduction connection assembly; and a second end of the connecting member is located outside the housing and configured to be communicated to the head portion induction element; and the control member is provided on the connecting member, when the cutter head is closed relative to the machine body, the second end is communicated to the head portion induction element, and the first end is communicated to the conduction connection assembly, so that the control chip is communicated to the head portion induction element; and when the cutter head is opened relative to the machine body, the second end is disconnected from the head portion induction element, and the control member makes the first end disconnected from the conduction connection assembly, so that the control chip is disconnected from the connecting member and the head portion induction element at the same time.

8. The electric shaver according to claim 7, wherein the connecting member comprises a connecting component and a blocking component, the connecting component passes through the control connection hole, and one end of the connecting component is located in the housing, the other end of the connecting component is located outside the housing, the blocking component is connected to one end of the connecting component located inside the housing; and the blocking component is configured to abut against the housing to prevent the connecting member from disengaging from the housing.

9. The electric shaver according to claim 7, wherein the control member comprises an elastic component, the elastic component is connected to the connecting member, and the elastic component is configured to make the connecting member have a tendency of moving away from the conduction connection assembly, when the cutter head is closed relative to the machine body, the connecting member compresses the elastic component, and the first end of the connecting member is communicated to the conduction connection assembly, so that the control chip is communicated to the head portion induction element through the conduction connection assembly and the connecting member sequentially; and when the cutter head is opened relative to the machine body, the connecting member is away from the conduction connection assembly under an action of an elastic force of the elastic component, so that the connecting member is disconnected from the conduction connection assembly, and the control chip is disconnected from the cutter head.

10. The electric shaver according to claim 4, wherein the guide assembly further comprises a cutter net contacting elastic piece, and the cutter net contacting elastic piece is provided on the cutter head, and connected to the head portion induction element, when the cutter head is closed relative to the machine body, the conduction control assembly is communicated to the head portion induction element through the cutter net contacting elastic piece.

11. The electric shaver according to claim 10, wherein the electric shaver further comprises a cutter head support movably connected to the machine body, wherein a plurality of cutter heads are provided, the plurality of cutter heads are all provided on the cutter head support, and the cutter net contacting elastic piece comprises a first elastic piece part connected to the head portion induction element and a second elastic piece part configured to be communicated to the conduction control assembly, wherein the first elastic piece part and the second elastic piece part are connected to each other, and the first elastic piece part and the cutter head are provided in a one-to-one correspondence.

12. The electric shaver according to claim 11, wherein a plurality of first elastic piece parts and a plurality of second elastic piece parts are provided, and the plurality of first elastic piece parts and the plurality of second elastic piece parts are alternately arranged in a circumferential direction.

* * * * *